United States Patent
Choi et al.

(10) Patent No.: US 8,271,053 B2
(45) Date of Patent: Sep. 18, 2012

(54) MOBILE TERMINAL AND POWER SOURCE CONTROLLING METHOD THEREOF

(75) Inventors: Haeng Keol Choi, Gyeonggi-do (KR); Bong Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 12/754,157

(22) Filed: Apr. 5, 2010

(65) Prior Publication Data

US 2011/0039605 A1 Feb. 17, 2011

(30) Foreign Application Priority Data

Aug. 12, 2009 (KR) .................. 10-2009-0074164

(51) Int. Cl.
*H04M 1/00* (2006.01)

(52) U.S. Cl. ............ 455/573; 455/572; 455/343.1; 455/343.6

(58) Field of Classification Search ............ 455/573, 455/572, 343.1, 343.6
See application file for complete search history.

(56) References Cited

U.S. PATENT DOCUMENTS

| | | | | |
|---|---|---|---|---|
| 7,378,818 B2 * | 5/2008 | Fowler et al. | .............. | 320/119 |
| 7,626,365 B2 * | 12/2009 | Patino et al. | .............. | 320/138 |
| 2006/0085167 A1 * | 4/2006 | Warfield et al. | .............. | 702/188 |
| 2007/0243852 A1 * | 10/2007 | Gibbs | .............. | 455/343.5 |
| 2008/0185915 A1 * | 8/2008 | Wang | .............. | 307/64 |
| 2010/0130263 A1 * | 5/2010 | Zhang et al. | .............. | 455/572 |
| 2010/0176760 A1 * | 7/2010 | Bullen | .............. | 320/101 |

* cited by examiner

*Primary Examiner* — Barry Taylor
(74) *Attorney, Agent, or Firm* — KED & Associates, LLP

(57) ABSTRACT

A mobile terminal and power source controlling method thereof are disclosed, by which inter-power source power forwarding operations among a plurality of power sources can be efficiently performed to correspond to a power forwarding command operation inputted by a user. The present invention includes a power supply unit including a first power source and a second power source, an output unit displaying first power source state information of the first power source and second power source state information of the second power source, a user input unit receiving an input of a power forwarding command action for forwarding a power from one of the first and second power sources to the other, and a control unit controlling the power supply unit to forward the power from one of the first and second power sources to the other to correspond to the inputted power forwarding command action, the control unit controlling the output unit to display the first and second power source state informations according to the power forwarding.

23 Claims, 42 Drawing Sheets

(a)　　　　　　　　　　　　(b)

(a)

(b)

(a)  (b)

(a)

(b)

(a)

(b)

(a)

(b)

MOBILE TERMINAL AND POWER SOURCE CONTROLLING METHOD THEREOF

Pursuant to 35 U.S.C. §119(a), this application claims the benefit of earlier filing date and right of priority to Korean Application No. 10-2009-0074164, filed on Aug. 12, 2009, the contents of which are hereby incorporated by reference herein in their entirety.

BACKGROUND

1. Field

The present invention relates to a mobile terminal, and more particularly, to a mobile terminal and power source controlling method thereof. Although the present invention is suitable for a wide scope of applications, it is particularly suitable for a mobile terminal including a plurality of power sources.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, a mobile terminal displays a power icon indicating a power state on a prescribed region on a standby image or can provide power source state information in case of executing a menu item corresponding to a power state check.

However, according to the related art, in case that a plurality of power sources are included in a mobile terminal, a method for providing power source state information on each of a plurality of power sources efficiently has not been provided yet.

In case that a solar battery is included in a mobile terminal, various kinds of power source state information related to the solar battery is not provided.

Moreover, in case that a plurality of power sources are included in the mobile terminal, a method of performing each inter-power source power forwarding operation has not been mentioned in detail.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
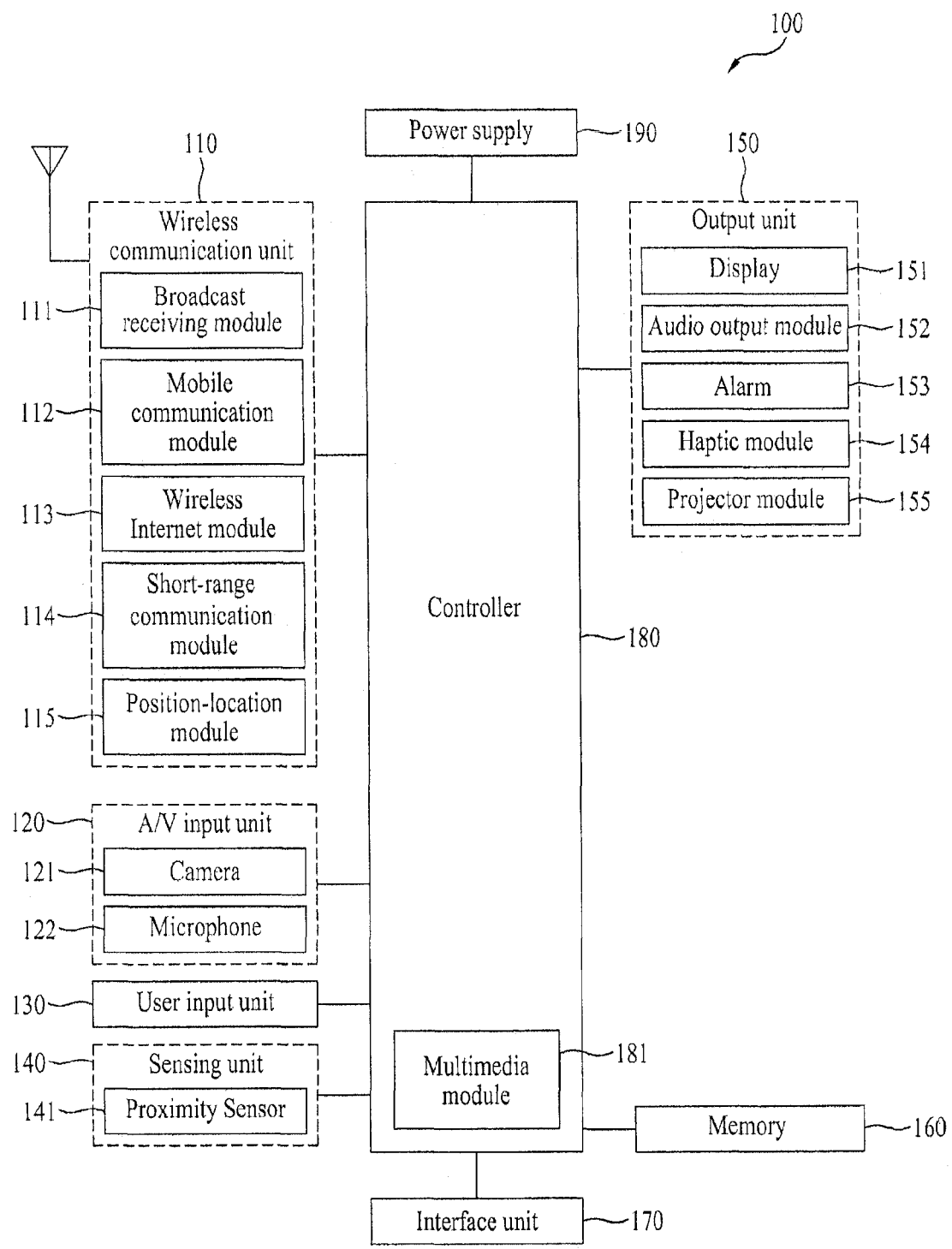
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller (or control unit) 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

The power supply unit 190 can include a plurality of power sources 191 and 192 and supplies a power required for an operation of each element from each of a plurality of the power sources under the control of the controller 180.

For instance, at least one of a plurality of the power sources can include a solar battery. Moreover, the power supply unit 190 can use a basic battery and a solar battery as a main power source and an auxiliary power source, respectively, and vice versa.

In particular, a solar battery converts solar energy to electric energy and generates electricity using p-type semiconductor and N-type semiconductor. For instance, if light is applied to a solar battery, electrons and holes are generated within the solar battery. Electric charges migrate to generate a potential difference between P and S poles. In this case, if a load is connected to the solar battery, electric current starts to flow.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
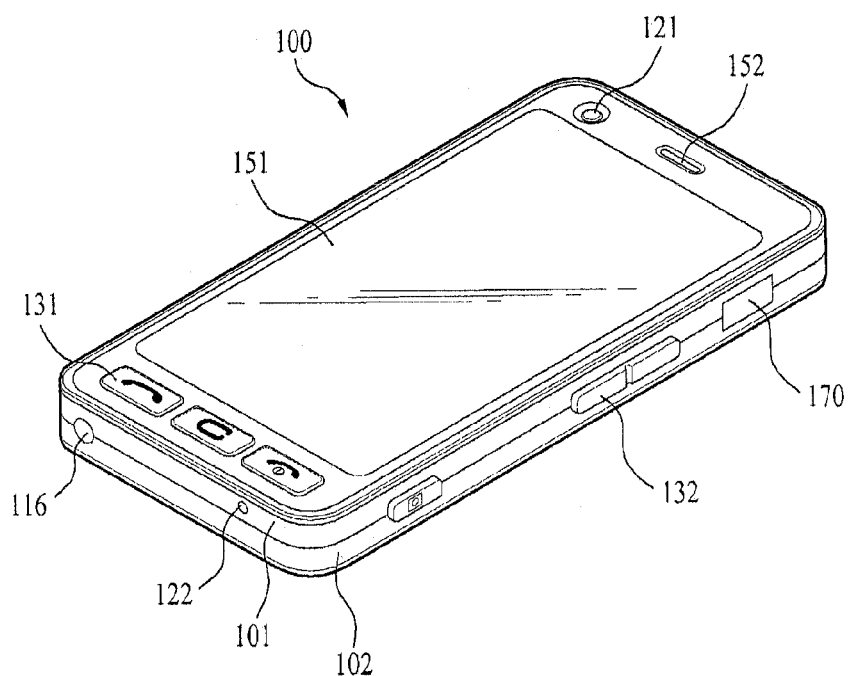
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
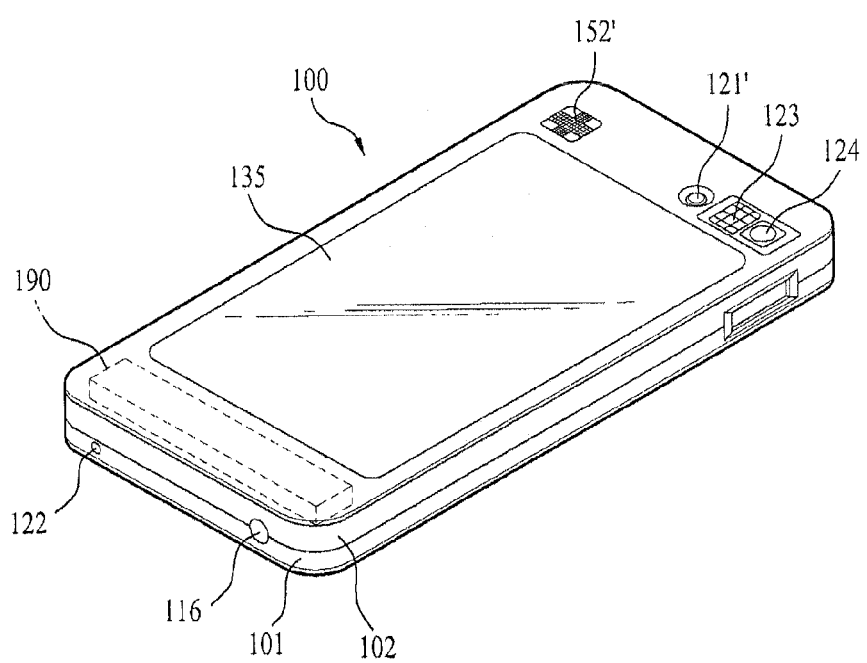
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3A and FIG. 3B as follows.

Figure 3A:
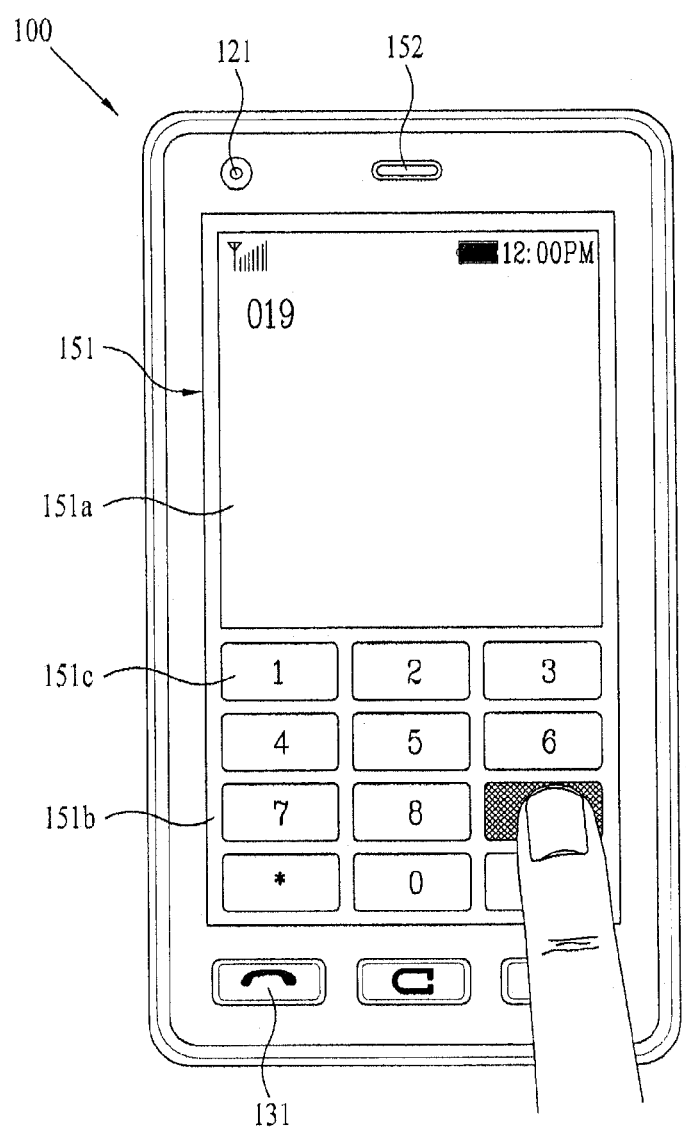
FIG. 3A and FIG. 3B are front diagrams of a mobile terminal according to one embodiment of the present invention for explaining one operational status of the mobile terminal, respectively.
Figure 3B:
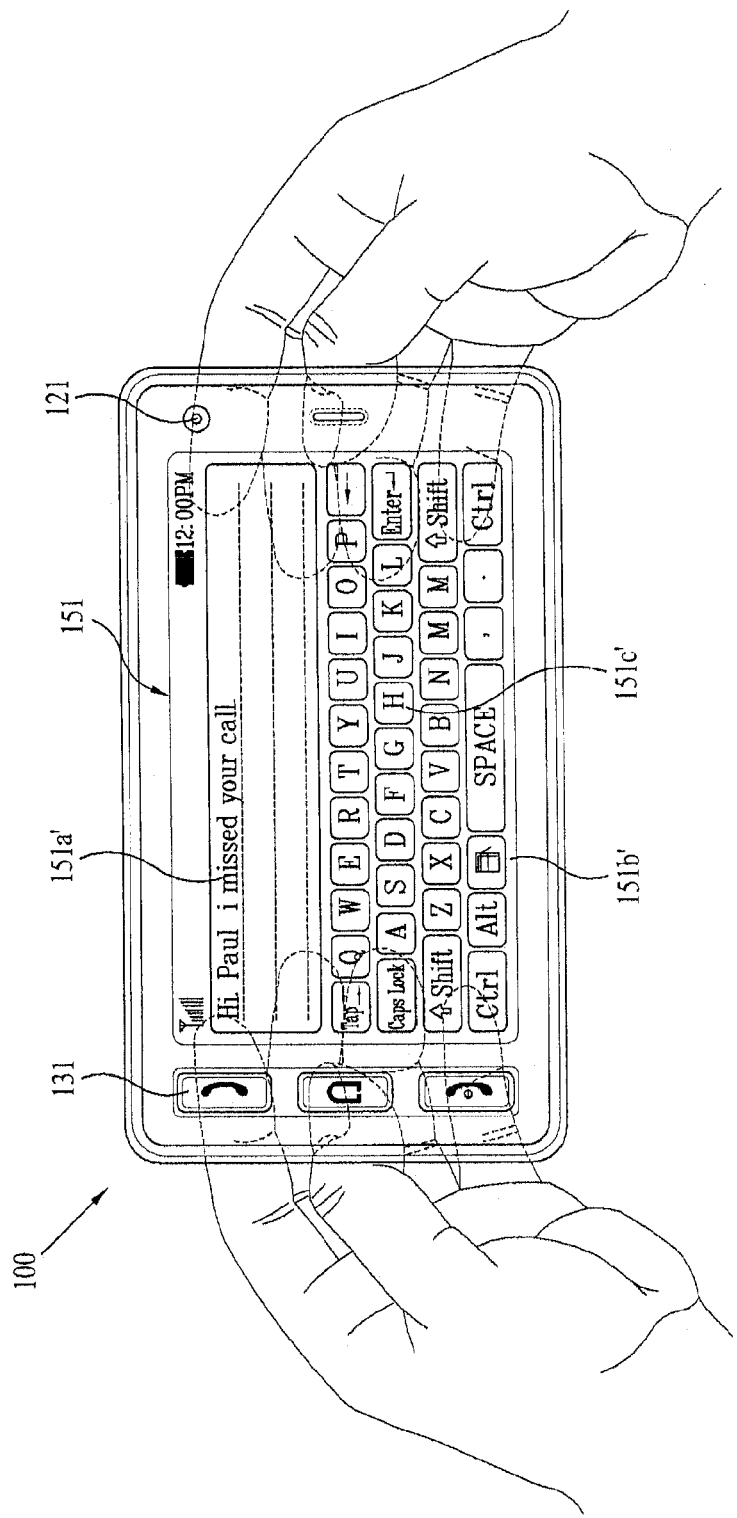

FIG. 3A and FIG. 3B are front-view diagrams of a terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display 151 can be configured to change an output picture according to the arranged direction of the terminal body.

FIG. 3B shows that a text input mode is activated in the terminal.

An output window 151a' and an input window 151b' are displayed on the display 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

In the following description, assume that a mobile terminal can include at least one of the elements shown in FIG. 1.

According to the present invention, if a power forwarding command operation is inputted by a user, the mobile terminal 100 performs power forwarding [First embodiment]. The mobile terminal 100 is able to perform power forwarding according to a per-power source power level determination result by the controller 180 [Second embodiment].

First of all, a first embodiment of the present invention is explained in detail with reference to FIGS. 4 to 10B.

Figure 4:
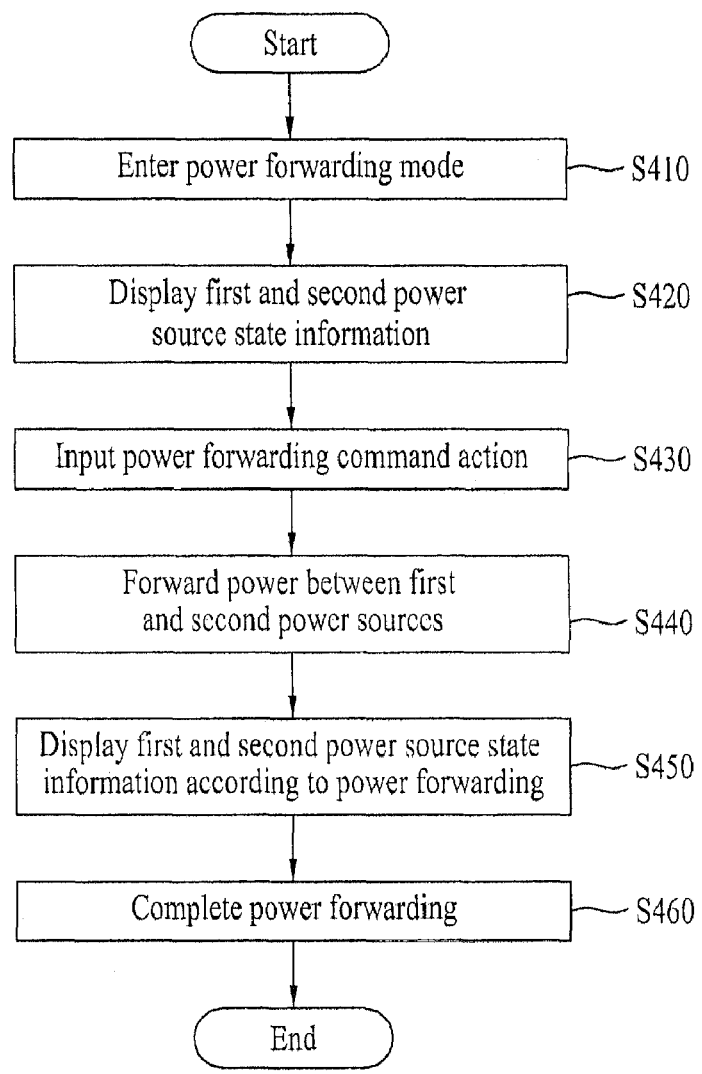
FIG. 4 is a first flowchart for a power controlling method of a mobile terminal according to one embodiment of the present invention.

FIG. 4 is a first flowchart for a power controlling method of a mobile terminal according to one embodiment of the present invention.

Referring to FIG. 4, the mobile terminal 100 enters a power forwarding mode under the control of the controller 180 [S410].

In this case, the power forwarding mode may mean a mode for enabling a plurality of power sources provided to the mobile terminal 100 to be forward their powers to each other.

In case that the mobile terminal 100 receives an input of a command signal for a power forwarding mode entry from a user via the user input unit 130 [Case 1] or the controller 180 of the mobile terminal 100 determines that it is a power forwarding necessary state [Case 2], the mobile terminal 100 is able to enter the power forwarding mode.

For instance, In Case 1, the command signal for the power forwarding mode entry can be inputted if a menu item corresponding to a power forwarding mode entry, a key, a key region (in case of touchscreen), an icon or the like is selected by a user. In Case 2, assuming that a first power source and a second power source exits, the power forwarding necessary state can include a state that a remaining power level of the first or second power source is equal to or lower than a minimum reference, a state that a charge completed state in case of charging the first or second power source, or a state that a remaining power level of the first or second power source is equal to or higher than a maximum reference.

Subsequently, the mobile terminal 100 displays power source state information of each of the first and second power sources via the display unit 151 under the control of the controller 180 [S420].

In this case, the power source state information can include a power level extent, power source type information, power source standby time information, charged state information and the like.

For instance, the power level extent can include a remaining power level, a charged power level in case of power source charging or the like. The power source type information can include information on whether a type of a power source is a basic battery for terminal, a solar battery, an auxiliary battery or the like. The power source standby time information can include a terminal operable time with a currently remaining power level (or a charged power level) or the like. And, the charged state information can include a charged power level in case of power source charging, a time taken for full charging, and the like.

The displaying step S420 can be performed in case that the power forwarding mode is entered. Alternatively, the displaying step S420 can be performed if a command signal for displaying power source state information is inputted by a user.

For instance, the command signal for displaying the power source state information can be inputted if a menu item, a key, a key region (in case of touchscreen), an icon or the like, which corresponds to the power source state information display, is selected by a user.

In the displaying step S420, the mobile terminal 100 is able to display the power source state informations using first and second power source icons indicating first and second power source state informations, respectively.

In the following description, the displaying step S420 is further explained in detail with reference to the accompanying drawings.

Figure 5A:
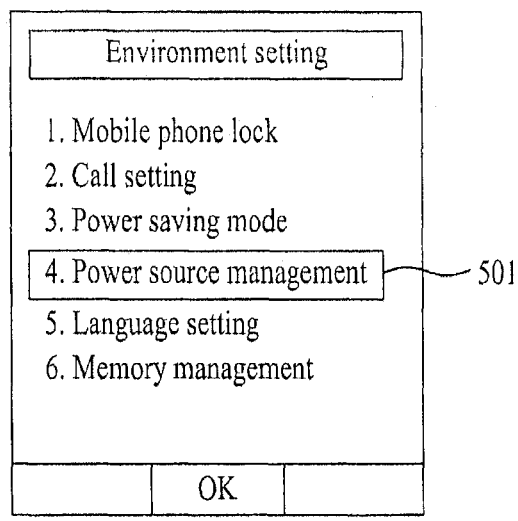
FIG. 5A and FIG. 5B are diagrams of screen configurations for displaying a power management menu item according to the present invention.
Figure 5B:
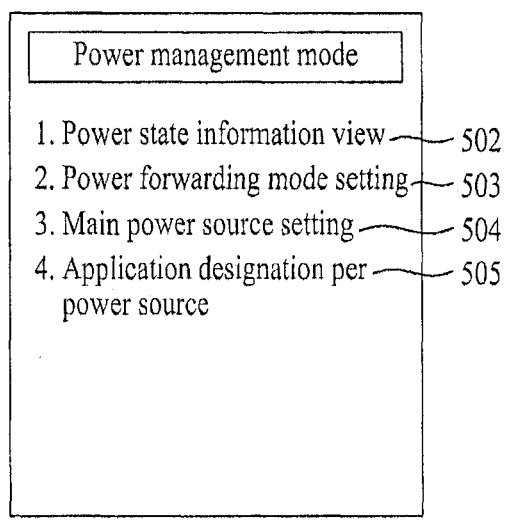

FIG. 5A and FIG. 5B are diagrams of screen configurations for displaying a power management menu item according to the present invention.

First of all, if a menu item corresponding to a mobile phone configuration setting is selected by a user, the mobile terminal 100 is able to display a subordinate menu item list belonging to the mobile phone configuration setting. In this case, a menu item corresponding to power management (hereinafter named a power management item) can be included in the subordinate menu item list [FIG. 5A].

In case that the power management menu item is selected in FIG. 5A, the mobile terminal 100 is able to display a subordinate menu item list pertaining to the power management [FIG. 5B].

For instance, a menu item 502 for a power state view, a menu item 503 for power forwarding mode setting, a menu item 504 for main power setting, a menu item 505 for application designation per power source and the like can be included in the subordinate menu item list pertaining to the power management.

FIGS. 6A to 8B are diagrams of screen configurations for displaying power source state information according to the present invention. For clarity and convenience of description, assume that a first power source and a second power source include a basic terminal battery and a solar battery, respectively.

For instance, if the menu item 502 for the power state view is selected in FIG. 5B, it is able to display power source state information.

Referring to FIGS. 6A to 8B, a first power source icon 610 and a second power source icon 620 are displayed on a screen. And, it is able to display a remaining power level of the corresponding power source using each of the power source icons 610 and 620.

For instance, assuming that an entire region of a power source icon amounts to 100% of a remaining power level, if a remaining power level of a first power source amounts to 80%, the mobile terminal 100 is able to display 80% of the entire region of a first power source icon using a dark color (or other color) (and vice versa). Optionally, it is able to indicate that a remaining power level amounts to 80% using a text. If a remaining power level of a second power source amounts to 20%, the mobile terminal 100 is able to display 20% of the entire region of a second power source icon using a dark color (or other color) (and vice versa). Optionally, it is able to indicate that a remaining power level amounts to 80% using a text.

Of course, as mentioned in the foregoing description, it is able to represent a remaining power level using the 'light and shade' (color) in a region of a power source icon or a text. Moreover, it is able to use various methods a means for indicating a remaining power level.

For instance, it is able to use a color change (10%_yellow), 50%_blue, 100%_red) or an activation count change (10%_1, 50%_3, 10%_6) of LED provided to one side of the mobile terminal. Moreover, it is able to use a size change of a power source icon according to a remaining power level extent.

Figure 6A:
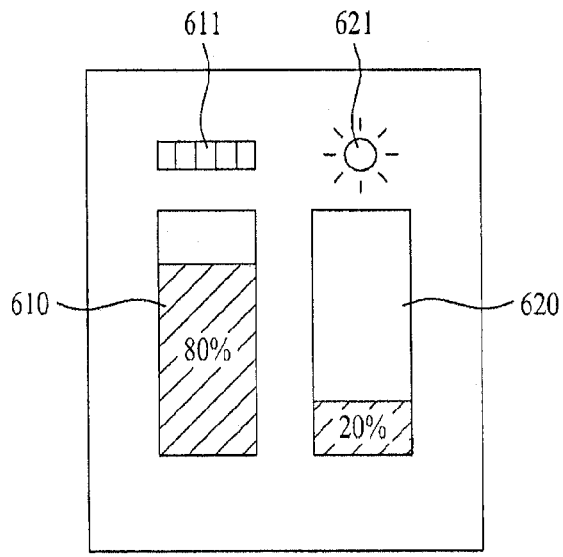
FIGS. 6A to 8B are diagrams of screen configurations for displaying power source state information according to the present invention.
Figure 6B:
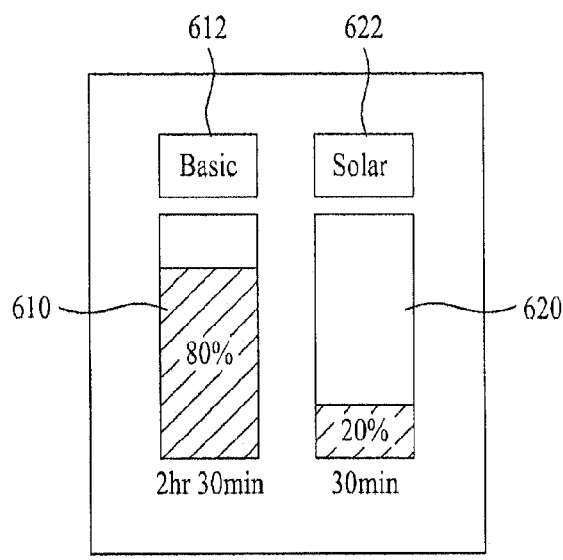

Referring to FIG. 6A and FIG. 6B, power source type information and power source standby time information can be provided as power source state information.

The mobile terminal 100 is able to represent a power source type of a first power source using a first power source type identifier 611/612. And, mobile terminal 100 is able to represent a power source type of a second power source using a second power source type identifier 621/622/

For instance, the first power source type identifier 611/612 indicates that the first power source is a basic terminal battery. And, the second power source type identifier 621/622 can indicate that the second power source is a solar battery. In particular, the first and second power source type identifiers 611 and 621 indicate corresponding power source types using icons(or images), respectively. And, the first and second power source type identifiers 612 and 622 can indicate corresponding power source types using texts, respectively.

Specifically, referring to FIG. 6B, the mobile terminal 100 is able to display power source standby time information of the first and second power sources. For instance, it can be observed that the first power source standby time is 2 hours. And, it can be also observed that the second power source standby time information is 30 minutes.

Figure 7A:
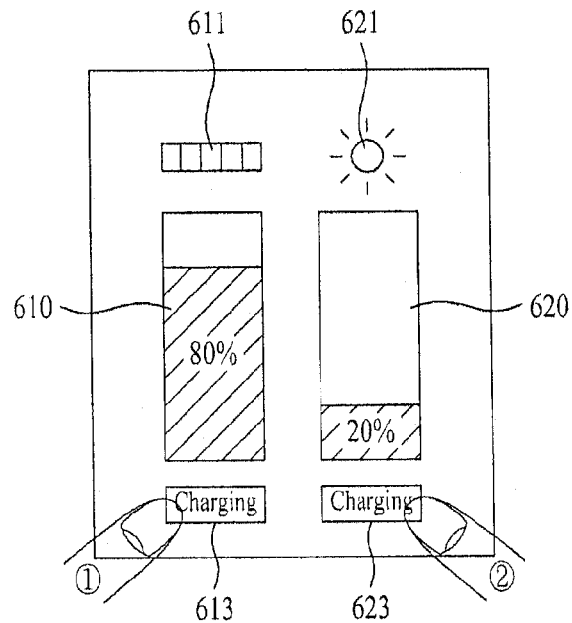
Figure 7B:
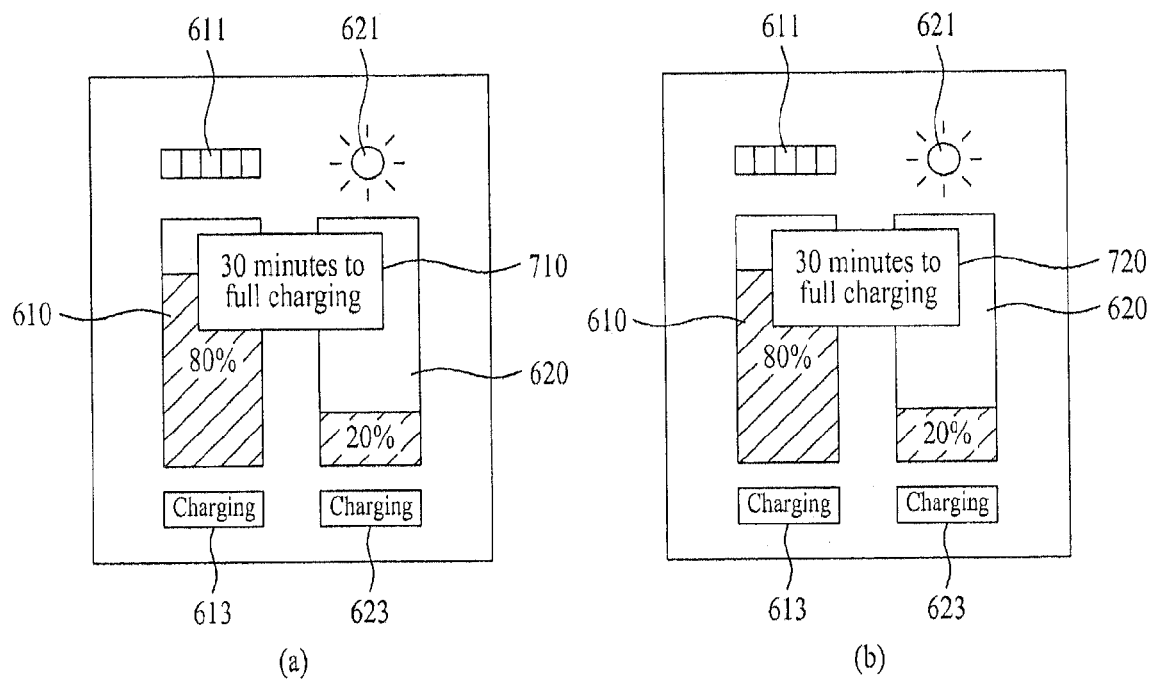

Referring to FIG. 7A and FIG. 7B, charged state information can be provided as power source state information.

First of all, if a first or second power source is being charged, the mobile terminal 100 is ale to indicate that an electric charging is in progress using a charging indication identifier 613 or 623 [FIG. 7A].

In case that the first charging indication identifier 613 is selected in FIG. 7A [①], the mobile terminal 100 is able to indicate a time (e.g., 30 minutes) taken to complete the full charging of the first power source [FIG. 7B (a)]. In case that the second charging indication identifier 623 is selected in FIG. 7A [②], the mobile terminal 100 is able to indicate a time (e.g., 2 hours and 30 minutes) taken to complete the full charging of the second power source [FIG. 7B (b)].

In this case, the charging indication identifier can be displayed using various means including a text, an icon, an image, a flash and the like.

Figure 8A:
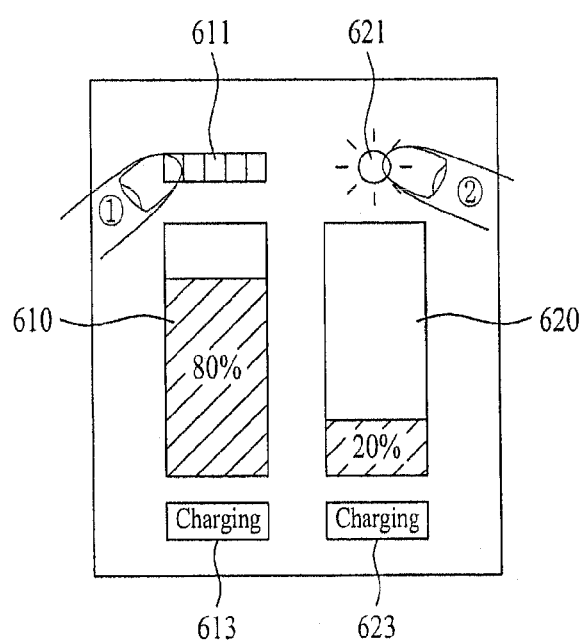
Figure 8B:
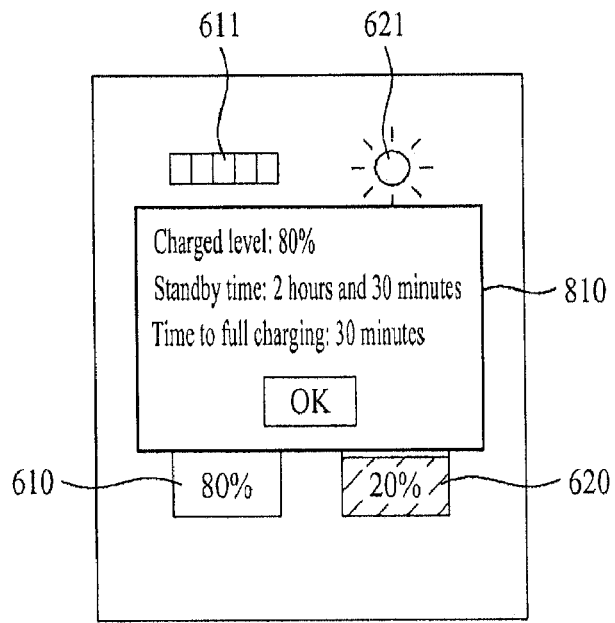
Figure 8B:
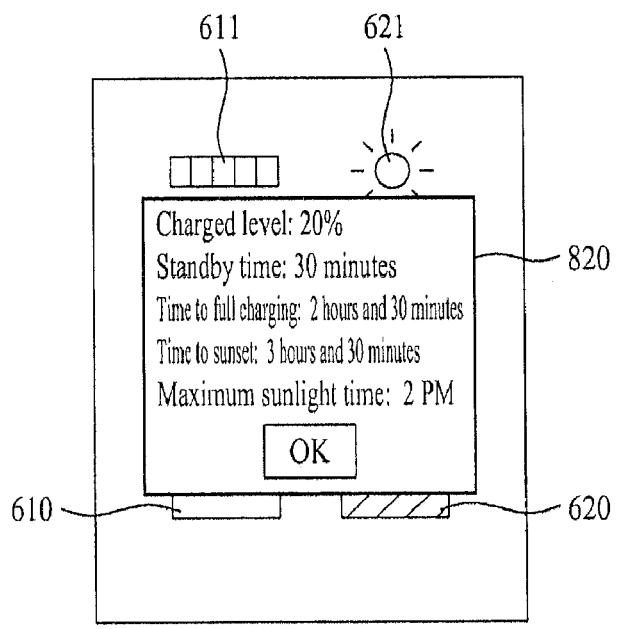

Referring to FIG. 8A and FIG. 8B, if a power source time identifier is selected, it is able to provide power source state information.

In case that the first power source type identifier 611 is selected in FIG. 8A [①], the mobile terminal 100 is able to indicate first power source state information [FIG. 8B (a)]. In case that the second power source type identifier 621 is selected in FIG. 8A [②], the mobile terminal 100 is able to indicate second power source state information [FIG. 8B (b)].

For instance, the first power source state information can include a charged level (80%), a power source standby time (2 hours and 30 minutes), a necessary full charging time (30 minutes) and the like of a basic terminal battery that is a first power source. The second power source state information can include a charged level (20%), a power source standby time (30 minutes) and a necessary full charging time (2 hours and 30 minutes) of a solar battery that is a second power source. And, the second power source state information can further include a time (3 hours and 30 minutes) left to sunset, a maximum sunlight time (2 pm) and the like, which are unique to the solar battery.

Besides, if a power source icon is selected in FIG. 8A, it is able to provide the power source state information shown in FIG. 8B [not shown in the drawings].

Referring now to FIG. 4, the mobile terminal 100 receives an input of a power forwarding command action from a user via the user input unit 130 [S430].

In this case, the power forwarding command action can include an action for selecting a menu item, a key or a key region (if a touchscreen is included), which corresponds to a power forwarding command. Moreover, the power forwarding command action can include a power forwarding command action, a forwarding power level specification action, an action for designating a power-supplying power source/a power-supplied power source, and the like.

For instance, in case of attempting to forward 20% of a power level to a second power source from a first power source, a user selects a menu item corresponding to a power forwarding command, designates the first power source and the second power source to a power-supplying power source and a power-supplied power source, respectively by selecting a menu item corresponding to a power supplying/supplied source specification, and then sets a forwarding power level to 20% of a total power level by selecting a menu item corresponding to a forwarding power level specification.

Moreover, the power forwarding command action can be inputted by a user using the first and second power source state informations displayed in the displaying step S420. In particular, the mobile terminal 100 is able to receive an input of a user touch action to the first or second power source icon as a power forwarding command action.

For instance, assuming a case of attempting to forward a power to a second power source from a first power source, a user touch action as a power forwarding command action includes at least one of a touch & drag from a first point of a first power source icon to a second point of a second power source icon, a touch to a first point of a first power source icon, and a touch & drag from a random point of a first power source icon to a first point. In this case, a forwarding power level may vary according to a location of the first point.

Under the control of the controller 180, the mobile terminal 100 forwards a power from one (hereinafter named a power-supplying power source) of the first and second power sources to the other (hereinafter named a power-supplied power source) to correspond to the power forwarding command action inputted in the inputting step S430 [S440].

In this case, the power forwarding command action can include information on a power forwarding command, a power-supplying power source, a power-supplied power source, a forwarding power level, a power forwarding direction and the like. Therefore, the controller 180 is able to perform a forwarding operation using the information included in the power forwarding command action.

Meanwhile, if a power-supplying power source, a power-supplied power source and a forwarding power level are designated in advance, the power forwarding command action can include a power forwarding command operation only.

In the forwarding step S440, to correspond to the power forwarding command action, it is able to forward a portion of a remaining power level (or a charging power level) of a power-supplying power source or a whole remaining power level of the power-supplying power source to a power-supplied power source. In doing so, the controller 180 is able to forward a power enough for the remaining power level of the power-supplying power source to maintain a power level limit. This is to guarantee the remaining power level of the power-supplying power source up to a minimum limit.

Under the control of the controller 180, the mobile terminal 100 displays the first and second power source state informations according to the power forwarding operation in the forwarding step S440 via the display unit 151 [S450].

In this case, the power source state information according to the power forwarding operation can include power forwarding speed information, power forwarding direction information, power forwarding situation information, power source standby time change information according to power forwarding and the like.

In the displaying step S450, it is able to display the first and second power source state informations according to the power forwarding operation using the first and second power source icons.

In the following description, the displaying step S450 is explained in detail with reference to the accompanying drawings.

FIGS. 9A to 10B are diagrams of screen configurations for displaying power source state information in accordance with inter-power source power forwarding according to the present invention.

For clarity and convenience of the following description, assume that remaining power levels of first and second power sources are 20% and 80%, respectively. And, assume that a power forwarding direction is set to a direction toward the first power source from the second power source.

Moreover, a first point of a second power source icon 620, which will be explained later, is a point located in a predetermined distance H from a peak point of a region corresponding to a remaining power level 80% in a whole region of the second power source icon 620. And, the first point of the second power source icon 620 is able to indicate a point that indicates a power level (hereinafter named a first forwarding power level) corresponding to a predetermined distance H in the remaining power level 80% or a limited distance of the predetermined distance H in a whole distance of a region corresponding to the remaining power level 80%.

For clarity and convenience of the following description, assume that a first point is the point that indicates a first forwarding power level corresponding to a predetermined distance H in a remaining power level.

Figure 9A:
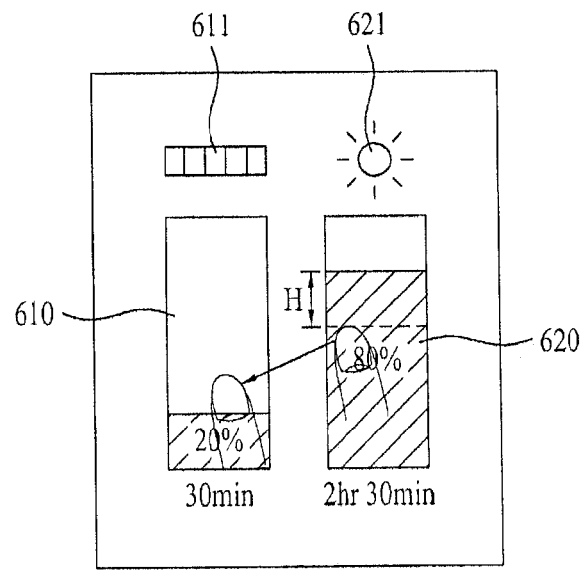
FIGS. 9A to 10B are diagrams of screen configurations for displaying power source state information in accordance with inter-power source power forwarding according to the present invention.

Referring to FIG. 9A, the mobile terminal 100 is able to receive an input of an action of a touch & drag to a second point of a first power source icon 610 from a first point of a second power source icon 620 as an action of a command for forwarding a power to a first power source from a second power source from a user.

Figure 9B:
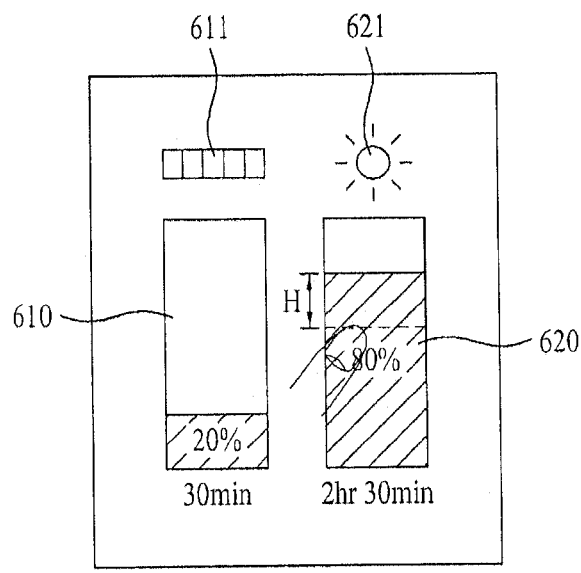

Referring to FIG. 9B, the mobile terminal 100 is able to receive an input of an action of a touch to a first of a second power source icon 620 as an action of a command for forwarding a power to a first power source from a second power source from a user.

Figure 9C:
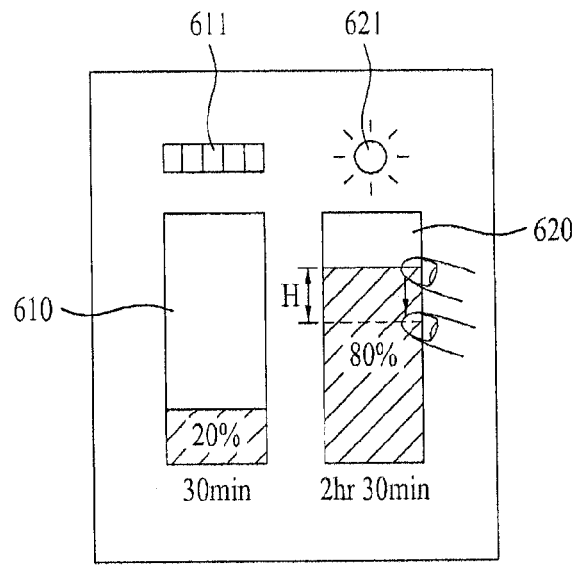

Referring to FIG. 9C, the mobile terminal 100 is able to receive an input of an action of a touch & drag to a first point from a random point (particularly, a peak point) of a second power source icon 620 as an action of a command for forwarding a power to a first power source from a second power source. In this case, a forwarding power level can be determined according to a distance to the first point from the random point. For instance, in case that the random point is the peak point, as a distance from the random point to the first point is H, a first forwarding power level can be determined. If a distance to the first point from the random point is 2H, a power level amounting to two times of the first forwarding power level can be determined.

Figure 9D:
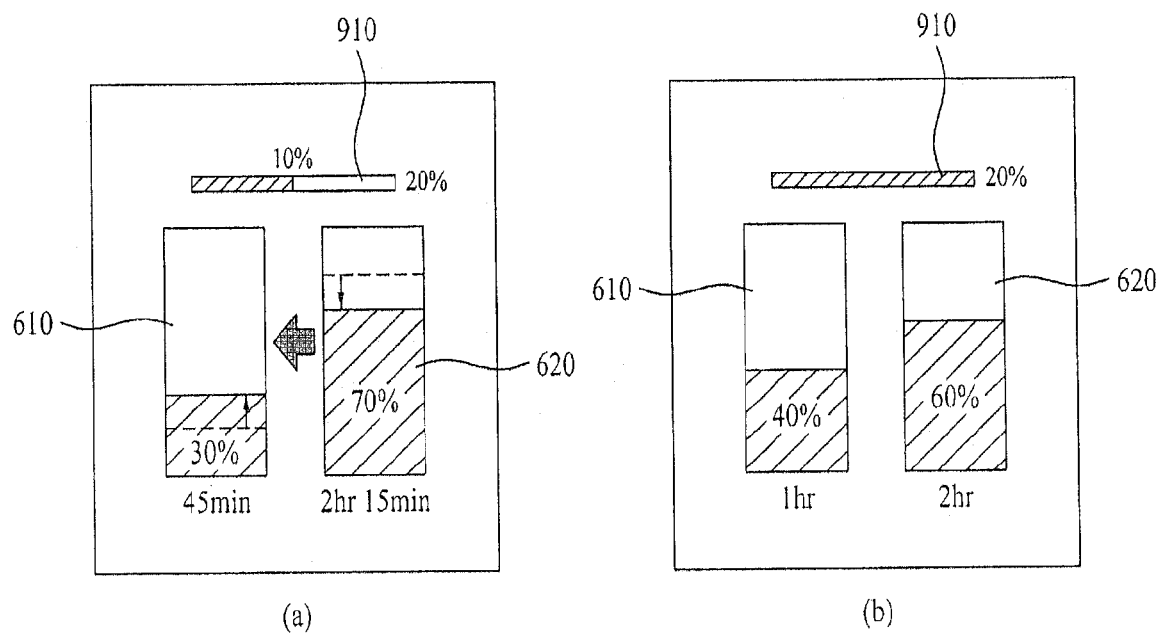

FIG. 9D shows power source state information in case that a power forwarding operation is performed to correspond to a power forwarding command action inputted in one of FIGS. 9A to 9C.

Referring to FIG. 9D, the mobile terminal 100 is able to display an identifier 910 for displaying a forwarding completed part (shaded part) and a forwarding incomplete part (blank part) in a first forwarding power level. Therefore, a user can be aware of a forwarding speed and a complete extent using the identifier 910.

Specifically, referring to FIG. 9D (*a*), the mobile terminal 100 displays a direction indicator 920 indicating a power forwarding direction toward a first power source. As a power forwarding is performed, the mobile terminal 100 is able to indicate an increase state of a first remaining power level and a decrease state of a second remaining power level via a first power source icon and a second power source icon, respectively. Moreover, the mobile terminal 100 is able to indicate a first power source standby time decreasing according to a decrease of the second remaining power level and a first power source standby time increasing according to an increase of the first remaining power level.

In other words, the mobile terminal 100 is able to provide a remaining power level and power source standby time of each power source by real time, which are changed according to the power forwarding.

In FIG. 9D (b), shown is a screen configuration in case that forwarding of a first forwarding power level from a second power source to a first power source is completed.

Besides, the mobile terminal 100 can receive an input of a power forwarding stop command signal from a user in the course of performing a power forwarding operation and is able to end the power forwarding operation correspondingly [not shown in the drawing].

In the above-described drawings, a touch action is taken as an example of a method for inputting a power forwarding command action. Alternatively, it is able to input a power forwarding command action by manipulating a direction key (a navigation key, a jog wheel/shuttle key, a touch key, etc.).

For instance, if a cursor is shifted to a second point from a first point by a manipulation of a direction key (or a mouse), it corresponds to a power forwarding action shown in FIG. 9A. If a cursor is shifted to a first point via a manipulation of a direction key and an OK key is then selected, it corresponds to a power forwarding action shown in FIG. 9B. If a cursor is shifted to a first point from a random point of a second power source icon by a manipulation of a direction key, it corresponds to a power forwarding action shown in FIG. 9C.

Figure 10A:
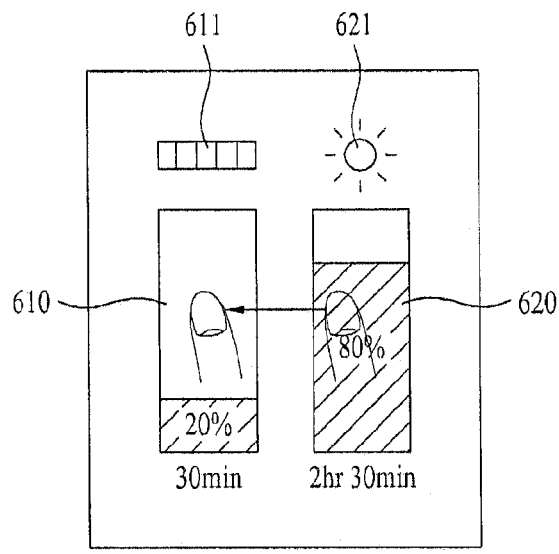
Figure 10B:
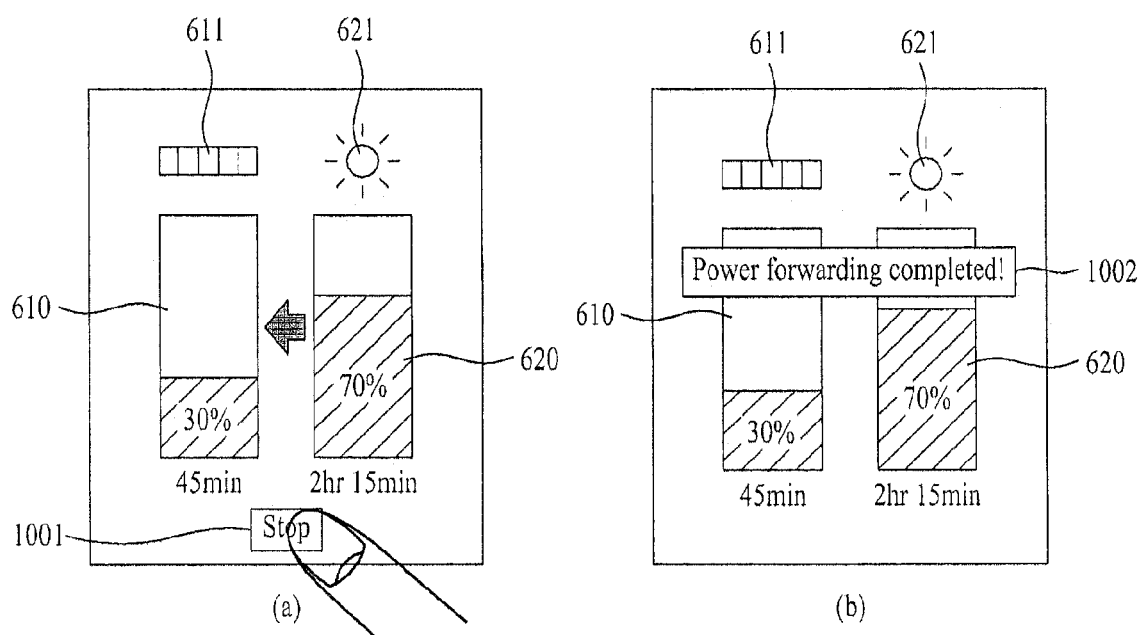

Moreover, referring to FIG. 10A and FIG. 10B, if a power forwarding command action (forwarding power level designating signal not included) including a power forwarding command signal from a second power source to a first supply is inputted by a user, the mobile terminal 100 is able to perform a power forwarding operation for forwarding a power to the first power source from the second power source.

For instance, the power forwarding command action can include a touch & drag to a random point of a first power source icon from a random point of a second power source icon [FIG. 10A].

In particular, referring to FIG. 10B, if a forwarding stop command signal is inputted by a user in the course of performing a power forwarding operation [(a)], the mobile terminal 100 is able to stop the power forwarding operation [(b)].

For instance, the forwarding stop command signal can be inputted if a stop key region 1001 on a screen is selected by a user. In case that the power forwarding operation is stopped, the mobile terminal 100 is able to output a text (or an audio) announcing that the power forwarding operation is stopped.

Referring now to FIG. 4, if the forwarding of the first forwarding power level to the power-supplied power source from the power-supplying power source is completed, the mobile terminal 100 is able to complete the power forwarding operation under the control of the controller 180 [S460].

Of course, even if the forwarding of the first forwarding power level is uncompleted, if a power forwarding stop command signal is inputted by a user or an inevitable reason (e.g., power-off of the terminal, etc.) for the stopping takes place, the controller 180 is able to complete the power forwarding operation.

In the following description, a second embodiment of the present invention is explained in detail with reference to FIGS. 11 to 14C.

Figure 11:
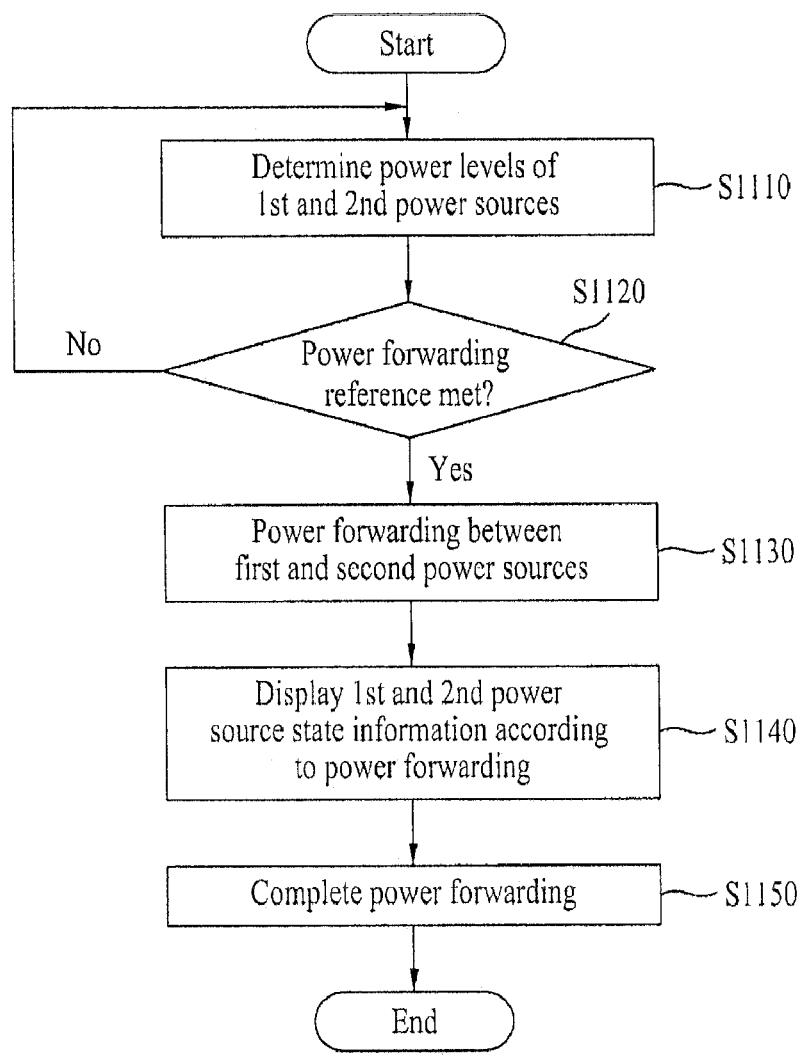
FIG. 11 is a second flowchart for a power controlling method of a mobile terminal according to one embodiment of the present invention.

FIG. 11 is a second flowchart for a power controlling method of a mobile terminal according to one embodiment of the present invention.

Referring to FIG. 11, the mobile terminal 100 determines a power level of a first power source and a power level of a second power source under the control of the controller 180 [S1110].

The determining step S1110 can be performed if an inter-power source power forwarding mode is entered. The determining step S1110 can be performed periodically or at a random timing point. In this case, the period or the random timing point can be set up by a selection made by a user or can be randomly set up by the mobile terminal.

In particular, in the determining step S1110, the controller 180 determines a remaining power level of the first power source and a remaining power level of the second power source. In case of an electric charging, the controller 180 is able to determine a remaining power level according to the charging.

Moreover, the controller 180 is able to output information on a power level, which is determined in the determining step S1110, of each of the first and second power sources via the output unit 150.

In this case, the information on the power level of each of the first and second power sources can correspond to the aforesaid power source state information. Therefore, the former embodiments of the power source state information described with reference to FIGS. 5A to 8B are applicable to this information.

Under the control of the controller 180, the mobile terminal 100 determines whether the power level of each of the first and second power sources determined in the determining step S1110 meets a power forwarding reference [S1120].

For instance, the power forwarding reference can include at least one of a case that one of the first and second power sources has a power level higher than that of the other by a predetermined level, a case that one of the first and second power sources has a power level equal to or higher than a first reference, a case that one of the first and second power sources is fully charged by 100%, and a case that the other one of the first and second power sources has a power level lower than a second reference.

Moreover, the power forwarding reference can be set up by a user or can be set in the terminal in advance. In particular, a user or a terminal is able to set a major factor for determining a power forwarding reference to the predetermined level, the first reference, the second reference, an extent of completion of charging, or the like.

Under the control of the controller 180, the mobile terminal 100 determines a power-supplying power source and a power-supplied power source according to a result of the determination made in the determining step S1120. The mobile terminal 100 then performs a power forwarding operation to supply a power to the power-supplied power source from the power-supplying power source [S1130].

For instance, if the determining step S1120 determines that a power level of the first power source is higher than that of the second power source, if the determining step S1120 determines that the power level of the first power source is equal to or higher than the first reference, if the determining step S1120 determines that the first power source is charged 100%, or if the determining step S1120 determines that the power level of the second power source is lower than the second reference, the controller 180 determines the first power source and the second power source as the power-supplying power source and the power-supplied power source, respectively and is then able to perform the power forwarding operation to forward a power to the second power source from the first power source.

In the forwarding step S1130, a remaining power level (or a charging power level) of the power-supplying power source can be forwarded to the power-supplied power source entirely or in part. In doing so, the controller 180 s able to forward a power as long as the remaining power level of the power-supplying power source maintains a power level limit. This is to guarantee the minimum limit for the remaining power level of the power-supplying power source.

Moreover, in case that a power forwarding command action is inputted by a user while the power forwarding reference is met, the mobile terminal 100 is able to perform a power forwarding operation according to either the power forwarding reference or the power forwarding command action.

For instance, the controller 180 is able to select either the power forwarding reference or the power forwarding command action according to a user selection or a priority. In this case, the priority is set up by a user or can be set up by the terminal in advance.

Besides, even if the determining step 1120 determines that the power forwarding reference is met, the mobile terminal 100 is able to perform the forwarding step S1130 only if the power forwarding is granted by a user.

FIGS. 12A to 12D are diagrams of screen configurations for enabling a user to select whether to perform power forwarding by power source level determination according to the present invention.

Figure 12A:
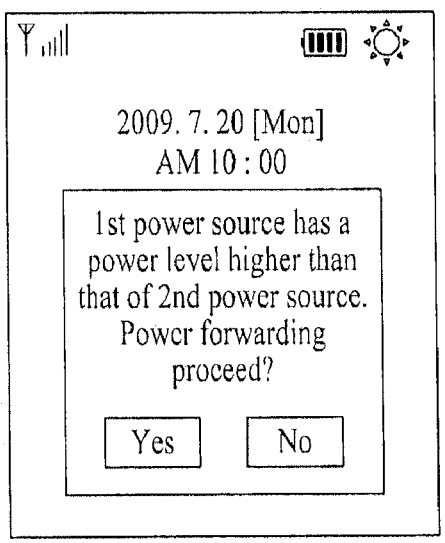
FIGS. 12A to 12D are diagrams of screen configurations for enabling a user to select whether to perform power forwarding by power source level determination according to the present invention.

Referring to FIG. 12A, if a power level of a first power source is higher than that of a second power source by a predetermined level, the mobile terminal 100 informs a user of it and then enables the user to select whether to perform a power forwarding from the first power source to the second power source.

Figure 12B:
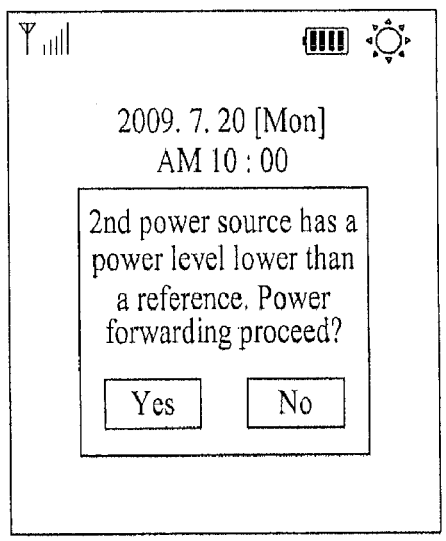

Referring to FIG. 12B, if a power level of a second power source is smaller than a second reference, the mobile terminal 100 informs a user of it and then enables the user to select whether to perform a power forwarding from the first power source to the second power source.

Figure 12C:
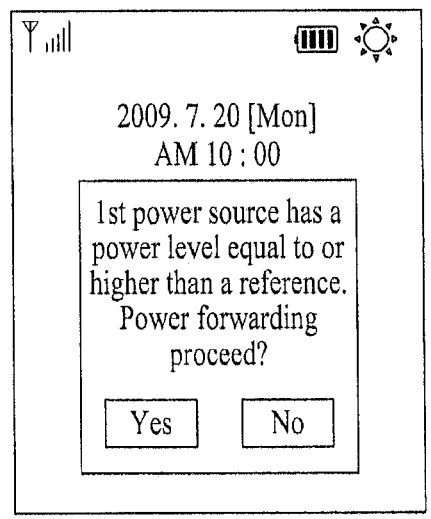

Referring to FIG. 12C, if a power level of a first power source is equal to or higher than a first reference, the mobile terminal 100 informs a user of it and then enables the user to select whether to perform a power forwarding from the first power source to the second power source.

Figure 12D:
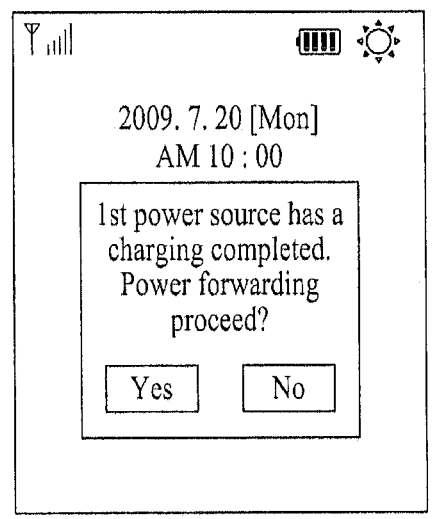

Referring to FIG. 12D, if an electric charging of a first power source is completed, the mobile terminal 100 informs a user of it and then enables the user to select whether to perform a power forwarding from the first power source to a second power source.

If the power forwarding ('yes') is selected in one of FIGS. 12A to 12D, the controller 180 is able to control the power supply unit 190 to forward a power to the second power source from the first power source.

Referring now to FIG. 11, the mobile terminal 100 is able to forward the forwarding power level previously designated in the forwarding step S1130 or the forwarding power level selected by the user to a power-supplied power source from a power-supplying power source.

Figure 13A:
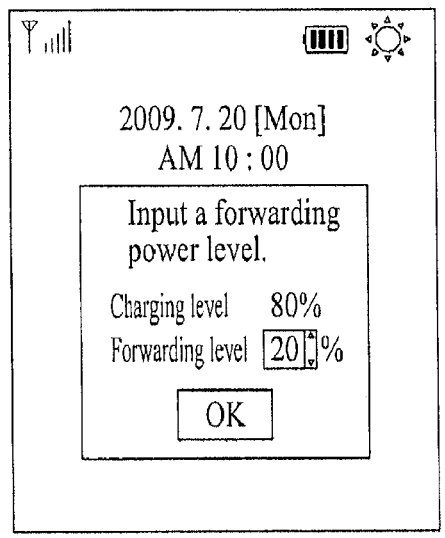
FIG. 13A and FIG. 13B are diagrams of screen configurations for enabling a user to select a forwarding power level according to the present invention.
Figure 13B:
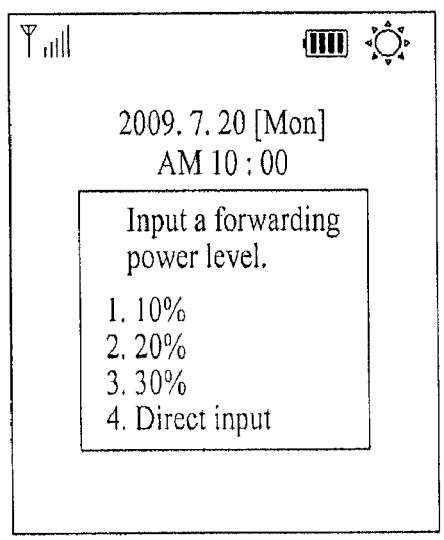

FIG. 13A and FIG. 13B are diagrams of screen configurations for enabling a user to select a forwarding power level according to the present invention.

Referring to FIG. 13A, a user is able to directly input a forwarding power level to the mobile terminal 100. Referring to FIG. 13B, a user is able to select a specific forwarding power level from a forwarding power level list. Therefore, the mobile terminal is able to forward the inputted or selected forwarding power level to a power-supplied power source from a power-supplying power source.

Referring now to FIG. 11, under the control of the controller 180, the mobile terminal 100 displays first power source state information and second power source state information according to the power forwarding operation in the forwarding step S1130 via the display unit 151 [S1140].

In this case, the power source state information according to the power forwarding operation can include power forwarding speed information, power forwarding direction information, power forwarding situation information, power source standby time change information according to power forwarding and the like.

In the displaying step S1140, it is able to display the first power source state information and the second power source state information according to the power forwarding operation using a first power source icon and a second power source icon. For instance, the former embodiments described with reference to FIGS. 9D to 10B are applicable to the displaying step S1140.

The displaying step S1140 is explained in detail with reference to the accompanying drawings as follows.

Figure 14A:
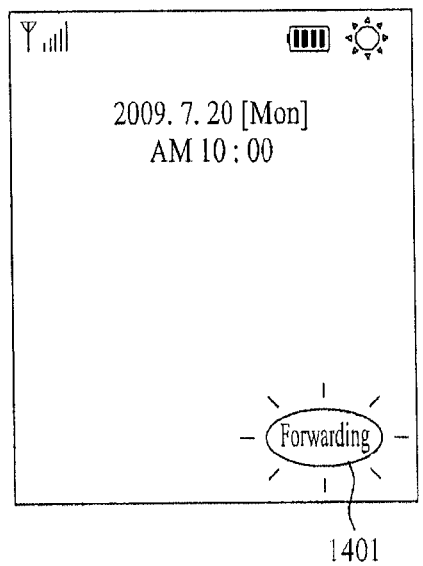
FIGS. 14A to 14C are diagrams of screen configurations for displaying indication information of a power forwarding state according to the present invention.
Figure 14B:
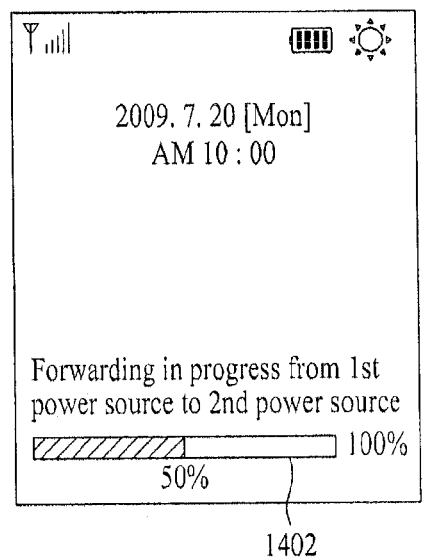
Figure 14C:
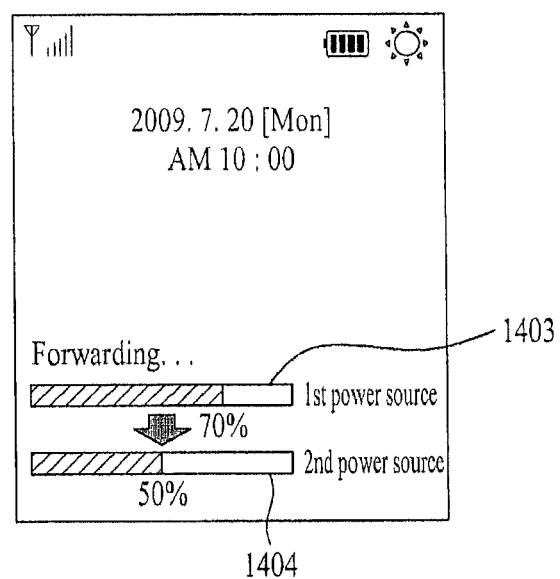

FIGS. 14A to 14C are diagrams of screen configurations for displaying indication information of a power forwarding state according to the present invention. For clarity and convenience of the following description, assume that indication information on a power forwarding state is displayable in a standby mode or a specific application driven mode.

Referring to FIG. 14A, in case that a power forwarding operation is in progress, the mobile terminal 100 is able to display a forwarding indication icon 1401 on a prescribed region of a screen.

For instance, according to a power forwarding progress extent, a size, color, density of the forwarding indication icon 1401 and the like are changeable.

Referring to FIG. 14B, in case that a power forwarding operation is in progress, the mobile terminal 100 is able to display a forwarding extent indicator 1402 on one region of a screen together with a text announcing that a power forwarding operation is in progress.

For instance, a shaded part of the indicator 1402 indicates a forwarding complete level, while a white part indicates a forwarding incomplete level. As the forwarding proceeds, a size of the shaded part can increase more. The indicator 1402 can be displayed in a manner of displaying a forwarding power level as 100% and a relative level (50%) of a forwarding complete level relative to the forwarding power level.

Referring to FIG. 14C, in case that a power forwarding operation is in progress, the mobile terminal 100 is able to display a power level indicator 1403 of a first power source and a power level indicator 1404 of a second power source.

For instance, in case that a power forwarding operation to a second power source from a first power source is being performed, it is able to display a power forwarding direction from the first power source to the second power source. And, it is also able to indicate a decrease extent (decrease of a shaded part) of a first power level using the first power level indicator 1403 and an increase extent (increase of a shaded part) of a second power level using the second power level indicator 1404.

Referring now to FIG. 11, the mobile terminal 100 is able to complete the power forwarding operation from the power-supplying power source to the power-supplied power source under the control of the controller 180 [S1150].

Of course, even if the power forwarding operation is being performed, the controller 180 is able to complete the power forwarding operation if a power forwarding stop command signal is inputted by a user or an inevitable reason (e.g., power-off of the terminal, etc.) for the stopping takes place.

In the above description, explained are various embodiments relating to power forwarding among a plurality of power sources. In the following description, explained in detail are the case that a plurality of power sources are provided and the case that a solar battery is included in a plurality of the power sources.

First of all, the mobile terminal 100 according to the present invention includes a plurality of power sources, e.g., a first power source and a second power source and is able to set a main power source to either the first power source or the second power source, under the control of the controller 180.

In this case, the main power source may mean a power source that is mainly responsible for a power required for an operation of the mobile terminal 100. Moreover, a power source, which is not the main power source, can be named a sub-power source. The sub-power source is operable as a power source subject if a power level of the main power source does not exist or is reduced below a predetermined reference level.

The controller 180 is able to set up a main power source according to at least one of a main power source selection signal externally inputted via the user input unit 130, a per-power source power level comparison result and a per-power source charged state comparison result.

Moreover, in case that either the first power source or the second power source includes a solar battery, if a sunlight intensity or a sunlight strength is equal to or greater than a predetermined reference, the controller 180 is able to set a main power source to a power source including the solar battery.

In the following description, the main power source setting is explained in detail with reference to the accompanying drawings. FIGS. 15A to 15D are diagrams of screen configurations for setting a main power source to one of a plurality of power sources according to the present invention.

Figure 15A:
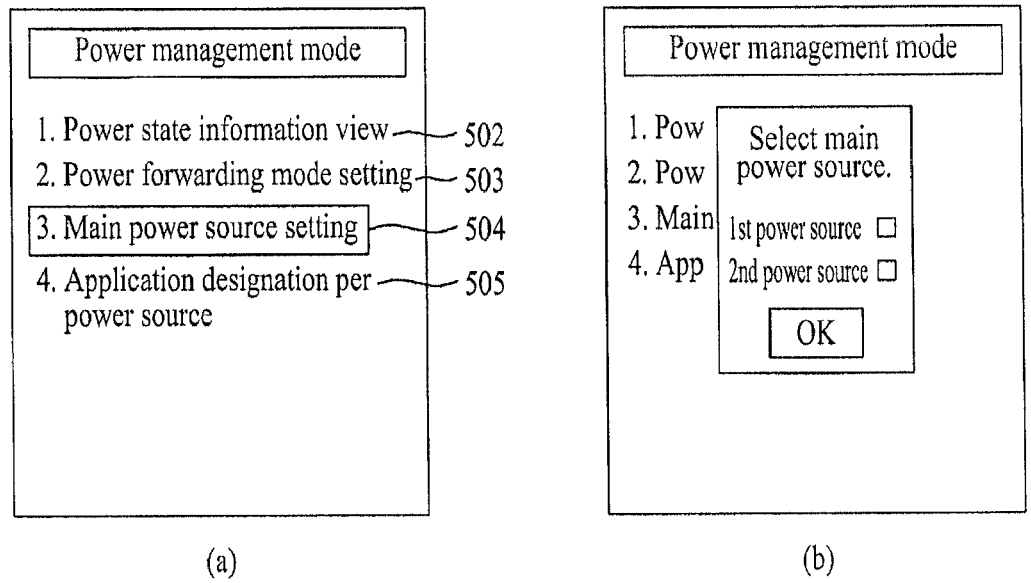
FIGS. 15A to 15D are diagrams of screen configurations for setting a main power source among a plurality of power sources according to the present invention.

Referring to FIG. 15A, if a menu item 504 for a main power source setting is selected by a user [(a)], the mobile terminal 100 is able to display a power source list on a screen [(b)]. In this case, power sources settable as a main power source are included in the power source list. And, a power source having a remaining power level lower than a predetermined reference may not be included in the power source list.

Figure 15B:
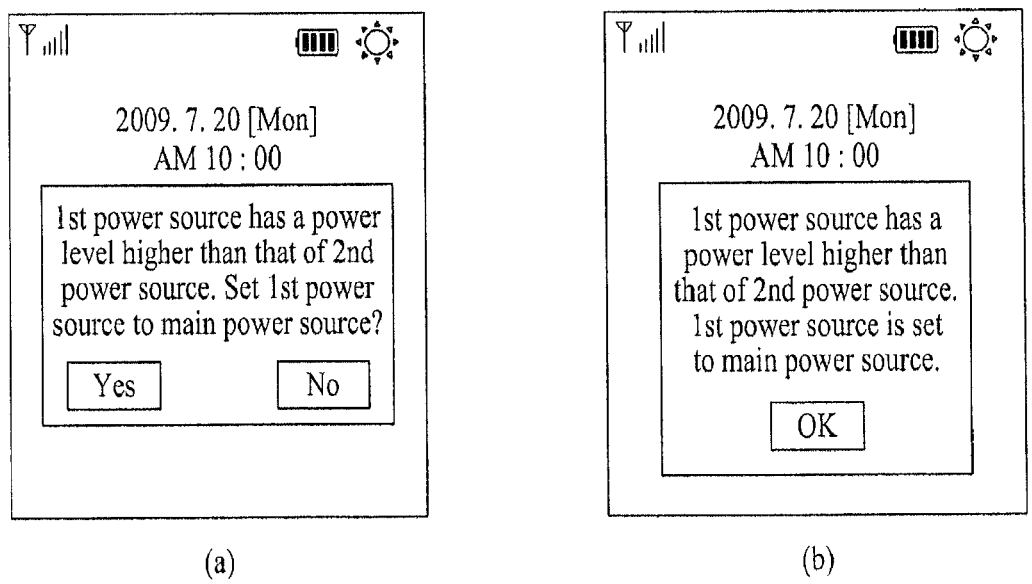

Referring to FIG. 15B, if a power level of a first power source is higher than that of a second power source, the mobile terminal 100 informs a user of it and is then able to set a main power source to the first power source [(a)]. Alternatively, the mobile terminal 100 automatically sets a main power source to the first power source and is then able to inform a user of this setting [(b)].

Figure 15C:
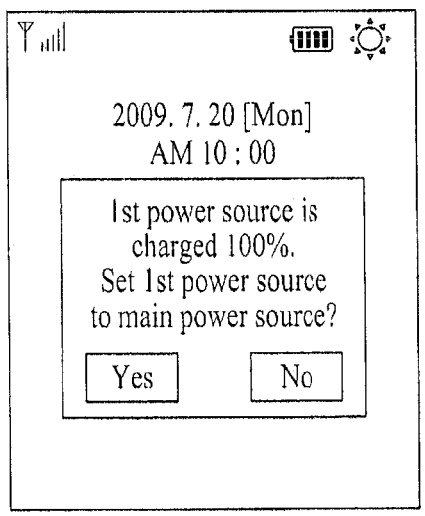
Figure 15C:
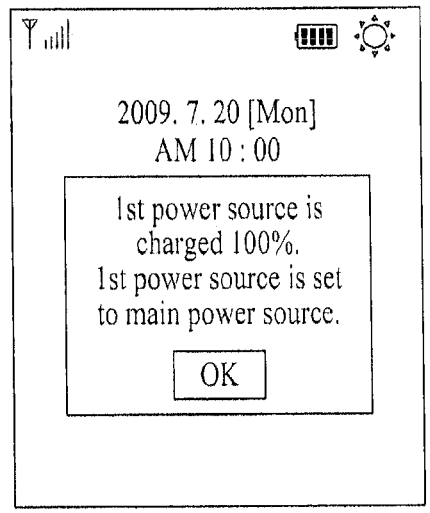

Referring to FIG. 15C, if an electric charging of a first power source is completed, the mobile terminal 100 informs a user of the completion of the electric charging and is then able to set a main power source to the first power source according to a user's determination [(a)]. Alternatively, the mobile terminal 100 automatically sets a main power source to the first power source and is then able to inform a user of this setting [(b)].

Figure 15D:
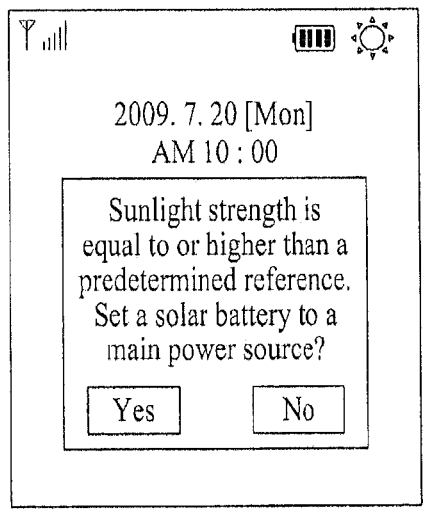
Figure 15D:
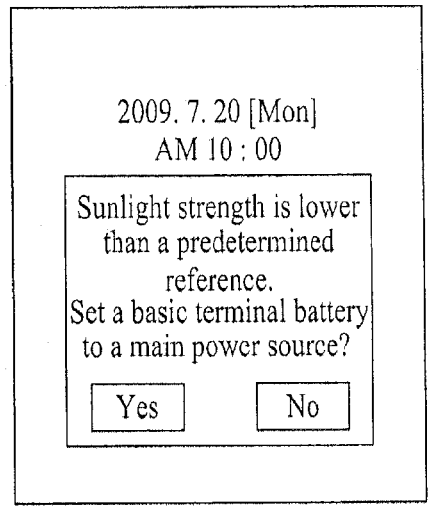

Referring to FIG. 15D, in case that a second power source includes a solar battery, if a sunlight strength or a sunlight intensity is equal to or greater than a predetermined reference, the mobile terminal 100 sets a main power source to the second power source including the solar battery [(a)]. If the sunlight strength or the sunlight intensity is smaller than the predetermined reference, the mobile terminal 100 sets a main power source to a first power source (e.g., a basic terminal battery) [(b)].

According to the present invention, the power source unit 190 charges at least one of a first power source and a second power source with electricity under the control of the controller 180. The controller 180 is then able to output power forwarding availability indication information on the charge-completed power source.

For instance, the power forwarding availability indication information can be outputted via such a means for indication as a text, an audio, an icon, an image, a flash, an animation, a bell sound, a vibration, a lamp (e.g., LED), an alarm sound and the like.

Furthermore, the controller 180 is able to output the power forwarding availability indication information on a power source charged with electricity over a predetermined reference (e.g., 80%, 90%, etc.).

Figure 16A:
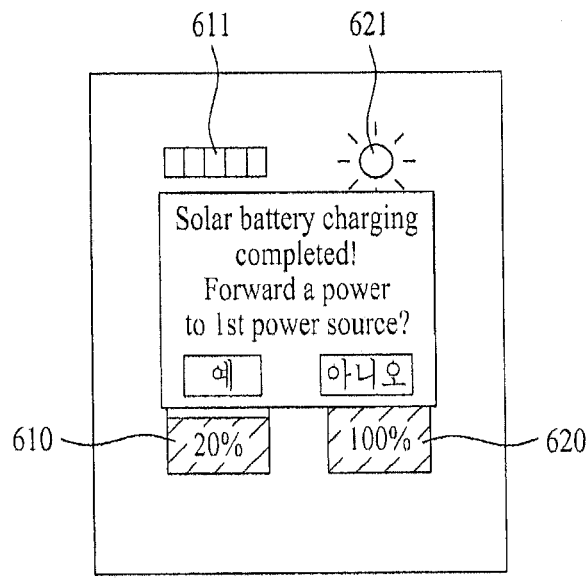
FIG. 16A and FIG. 16B are diagrams of screen configurations for displaying power forwarding availability indication information on a charge-completed power source according to the present invention.
Figure 16B:
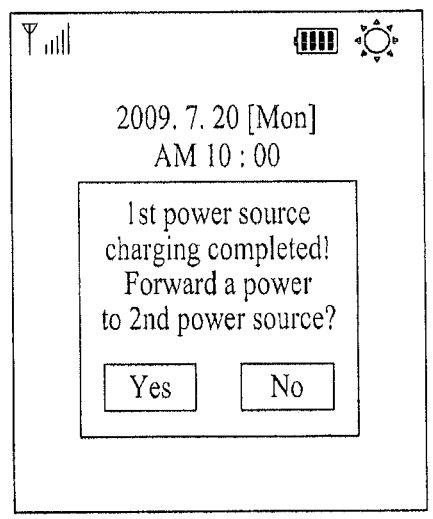

In the following description, the output of the power forwarding availability indication information is explained in detail with reference to the accompanying drawings. FIG. 16A and FIG. 16B are diagrams of screen configurations for displaying power forwarding availability indication information on a charge-completed power source according to the present invention.

Referring to FIG. 16A, if an electric charging of a second power source including a solar battery is completed, the mobile terminal 100 is able to enable a user to select whether to perform a power forwarding to a first power source from the second power source while announcing the charging completion of the second power source.

If a power forwarding ('yes') is selected in FIG. 16A, the mobile terminal 100 is able to perform a power forwarding operation to correspond to a power forwarding command action inputted by a user according to one of the embodiments described with reference to FIGS. 9A to 10B.

Referring to FIG. 16B, if an electric charging of a first power source is completed, the mobile terminal 100 is able to enable a user to select whether to perform a power forwarding from the first power source to a second power source while announcing the charging completion of the first power source.

If a power forwarding ('yes') is selected in FIG. 16B, the mobile terminal 100 is able to display indication information of a power forwarding state according to one of the embodiments described with reference to FIGS. 14A to 14C while performing the power forwarding operation.

If one of a plurality of power sources includes a solar battery, the mobile terminal 100 is able to display a power source state icon indicating a charged level of the solar battery and a sunlight strength on one region of a screen in a standby mode (or an application driven mode) under the control of the controller 180. Of course, a power source state icon of each of a plurality of the power sources can be displayed on a corresponding region of the screen.

Figure 17A:
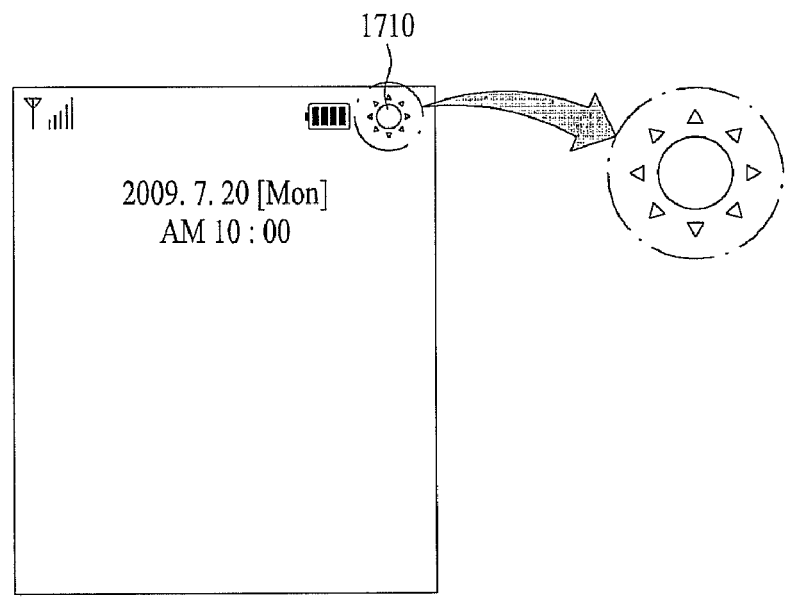
FIG. 17A and FIG. 17B are diagram of screen configurations for displaying a power state icon indicating a charged level of a solar battery and a sunlight strength according to the present invention.
Figure 17B:
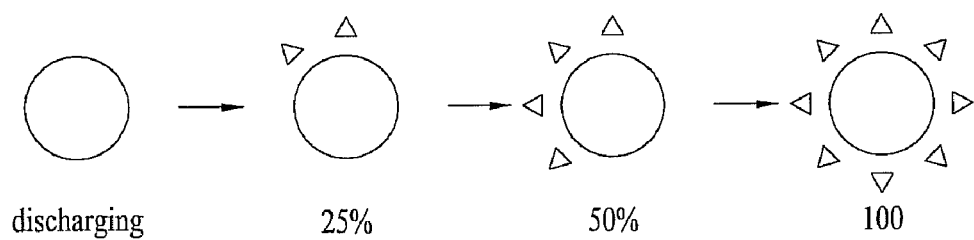
Figure 17B:
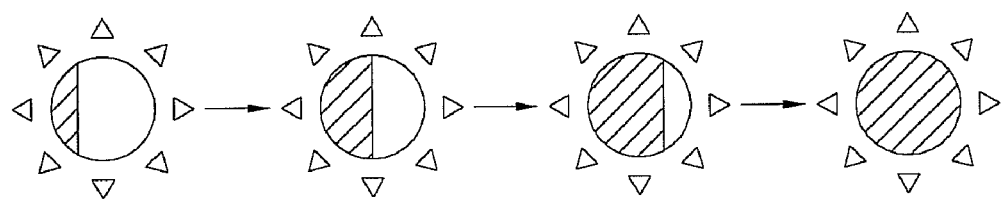

In the following description, the display of a power source state icon is explained in detail with reference to the accompanying drawings. FIG. 17A and FIG. 17B are diagram of screen configurations for displaying a power state icon indicating a charged level of a solar battery and a sunlight strength according to the present invention.

Referring to FIG. 17A, the mobile terminal 100 is able to display a power source state icon 1710 indicating a charged level of a solar battery and a sunlight strength on a screen in a standby mode.

In particular, the power source state icon 1710 can include a first part 1711 for indicating a charged level extent of the solar battery and a second part 1712 for indicating a strength of a sunlight incident on the solar battery.

In FIG. 17B (a), as a charging operation of a solar battery is performed, if a charged extent of a solar battery is increased, the number of the second parts 1712 is incremented to indicate a charged level increase state of the solar battery.

For instance, if the second part 1712 does not exist, it is ale to indicate a discharged state. If two second parts 1712 exist, it is able to indicate a 25% charged level. If four second parts 1712 exist, it is able to indicate a 50% charged level. If eight second parts 1712 exist, it is able to indicate a 100% charged level.

In FIG. 17B (b), while an electric charging of a solar battery is in progress, it is able to indicate a strength of a sunlight incident on the solar battery by adjusting a size of a shaded portion of the first part 1711.

For instance, as a size of the shaded portion of the first part 1711 increases, it can be observed that a sunlight strength increases.

Moreover, in case that either a first power source or a second power source includes a solar battery, the mobile terminal 100 according to the present invention is able to display light-receiving stat indication information via the output unit 150 (particularly, the display unit 151) using a sun icon and a light-receiving target icon under the control of the controller 180.

In this case, the sun icon can indicate a location, an altitude and the like of sun for the mobile terminal 100. The light-receiving target icon is able to indicate a location of the mobile terminal 100 for sun, a sunlight intensity/strength extent and the like. The light-receiving state indication information can be displayed as one of background images in a standby mode. The light-receiving state indication information can be displayed if a corresponding menu item, a corresponding key, or a corresponding key region is selected.

For instance, the light-receiving state indication information can include at least one of a sunlight intensity, a sunlight strength, a charged level extent of a solar battery, an altitude and incident angle of sun for a terminal, and an optimal incident angle of sun for a terminal.

In particular, the sun icon, the light-receiving target icon and the light-receiving state indication information using them can be 3-dimensionally displayed on a screen.

In the following description, the displaying of the light-receiving state indication information is explained in detail with reference to the accompanying drawings. FIGS. 18A to 24C are diagrams of screen configurations for displaying light-reception state indication information using a solar icon and a light-reception target icon according to the present invention.

Figure 18A:
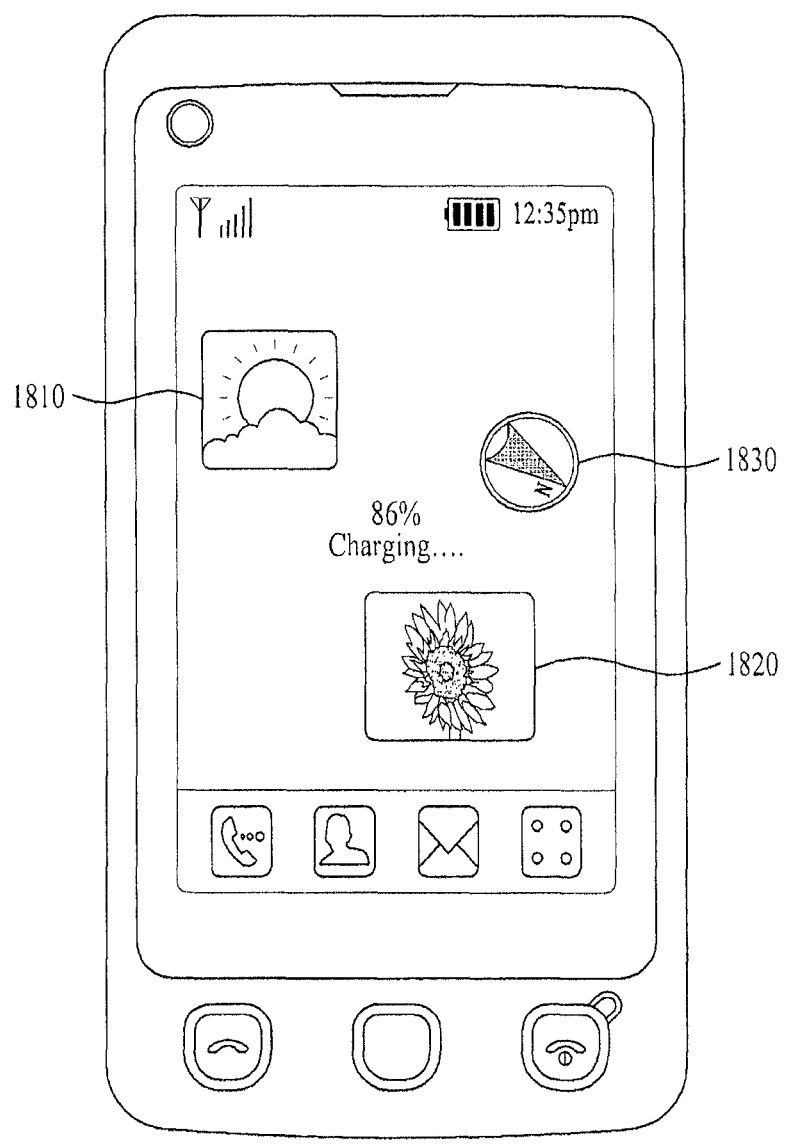
FIGS. 18A to 24C are diagrams of screen configurations for displaying light-reception state indication information using a solar icon and a light-reception target icon according to the present invention.
Figure 18B:
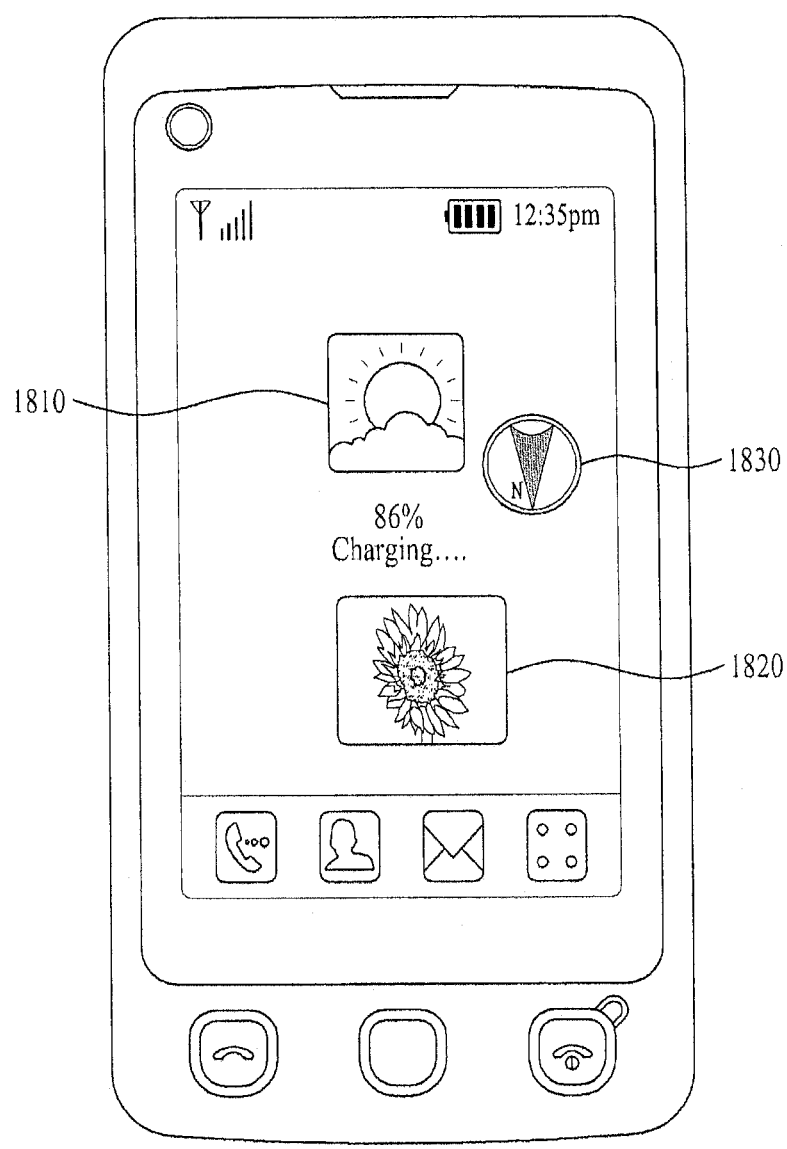
Figure 18C:
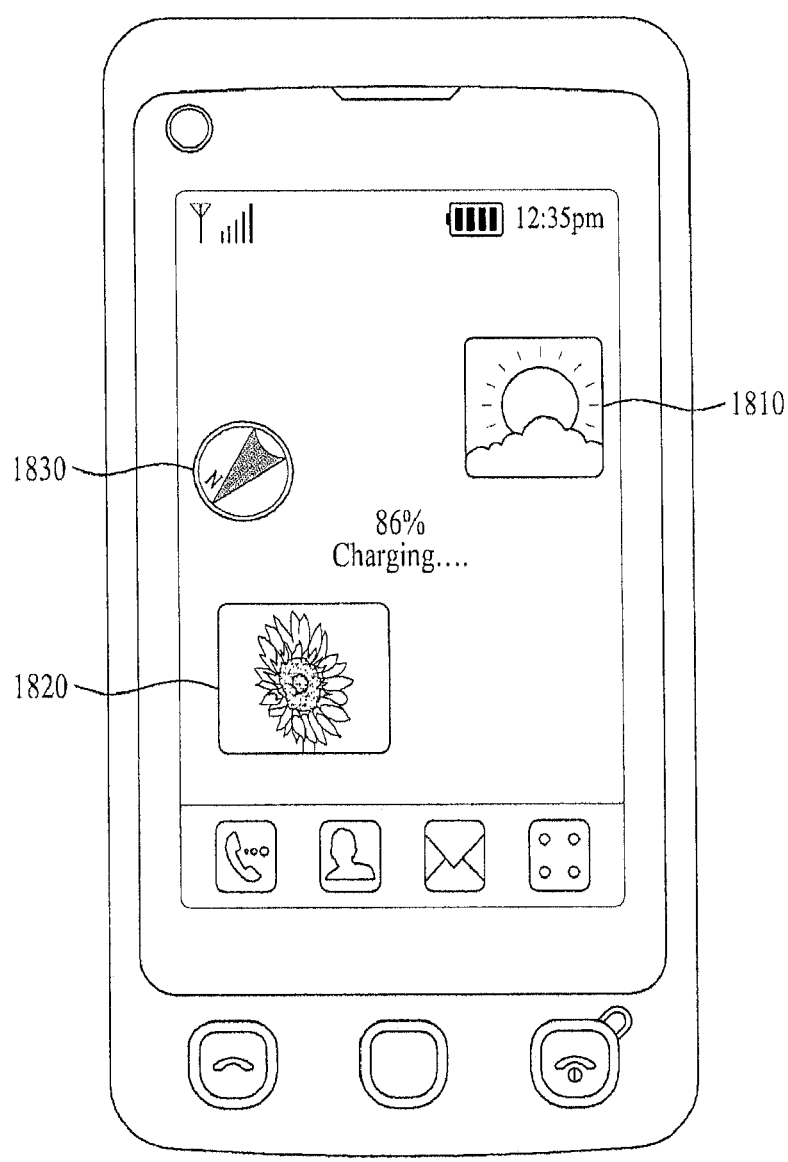

Referring to FIGS. 18A to 18C, the mobile terminal 100 is able to display a sun icon 1810, a light-receiving target icon 1820 and a direction icon 1830 indicating a direction of the mobile terminal 100 relative to the sun.

For instance, FIG. 18A shows that the mobile terminal 100 is located northeast against the sun, FIG. 18B shows that the mobile terminal 100 is located north against the sun, and FIG. 18C shows that the mobile terminal 100 is located northwest against the sun.

Hence, in case that a location of the mobile terminal 100 is changed or a location of the sun is changed according to a time shift, positions of the sun icon 1810 and the light-receiving target icon 1820 can be changed. And, a direction indicated by the direction icon 1830 can be correspondingly changed as well.

Figure 19A:
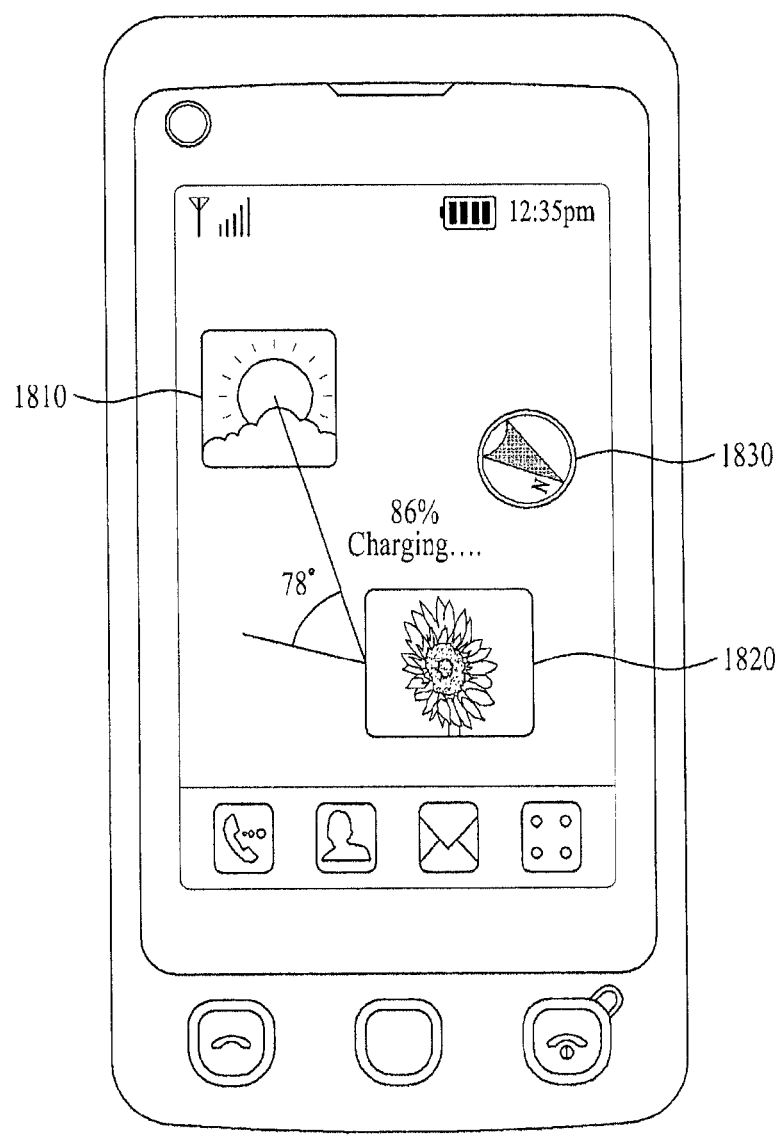
Figure 19B:
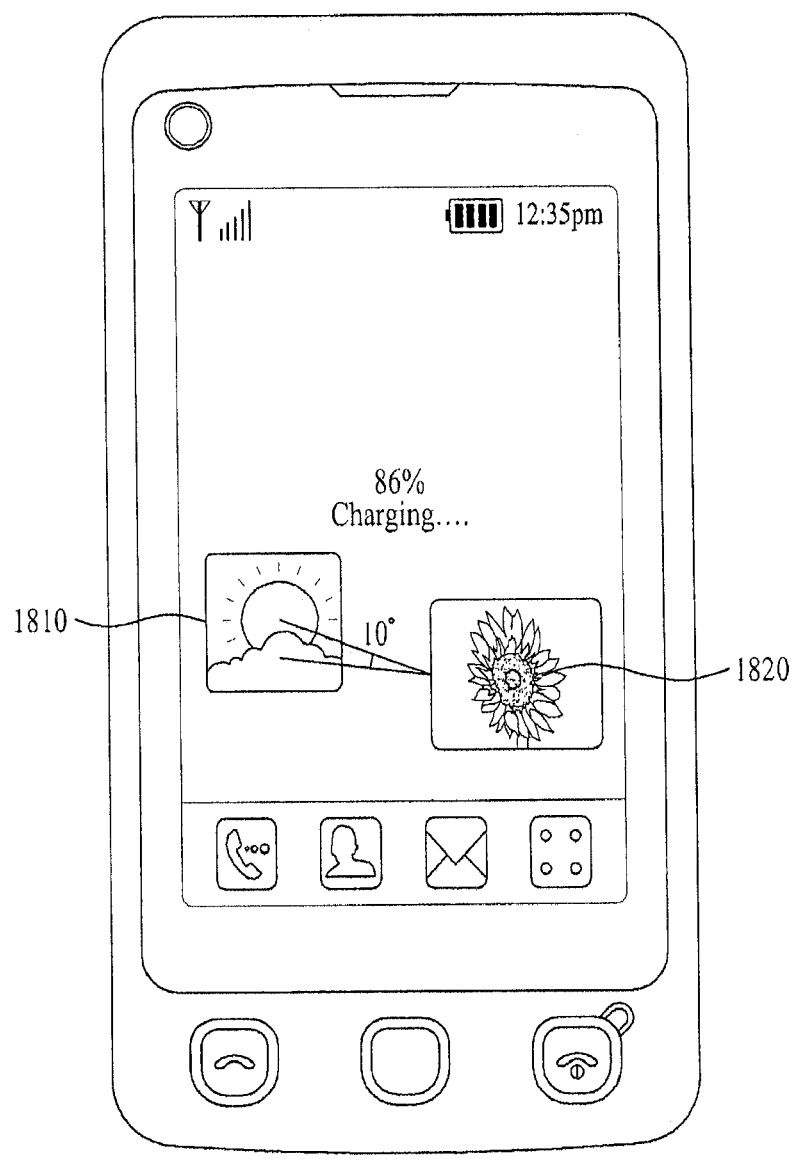

Referring to FIG. 19a And FIG. 19B, the mobile terminal 100 is able to indicate an altitude between the sun and the mobile terminal 100 by changing a position of a sun icon 1810 and a light-receiving target icon 1820 on a screen.

For instance, FIG. 19A shows a case that an altitude between the sun and the mobile terminal 100 is 78 degrees. And, FIG. 19B shows a case that an altitude between the sun and the mobile terminal 100 is 10 degrees.

Figure 20A:
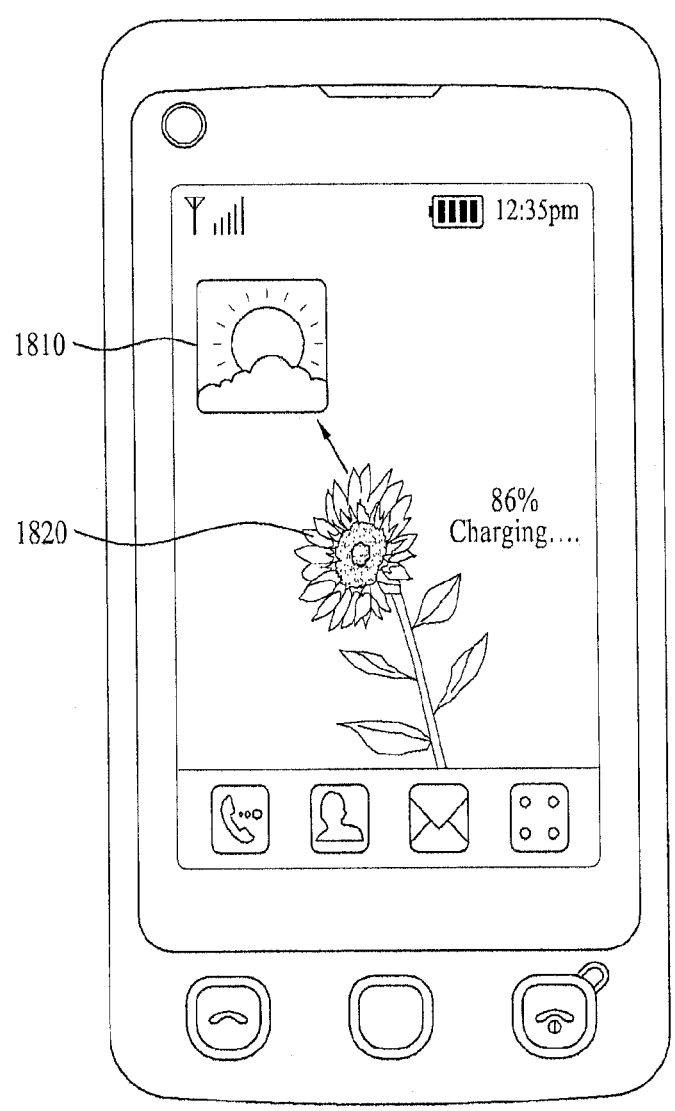
Figure 20B:
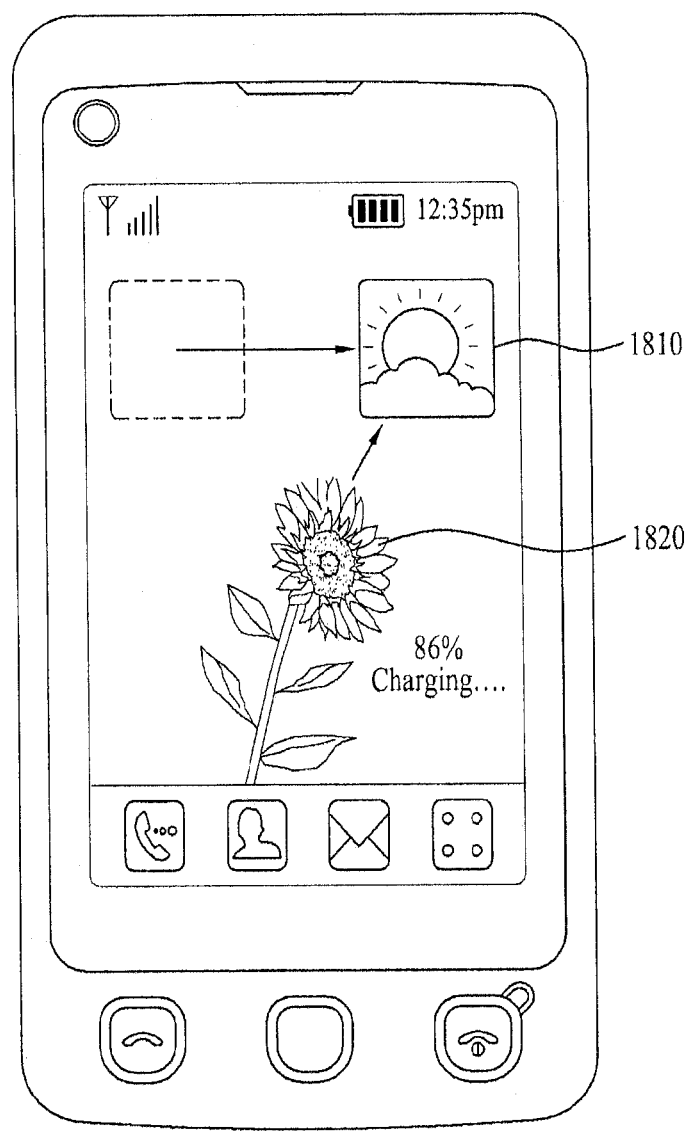

Referring to FIG. 20A and FIG. 20B, the mobile terminal 100 is able to a location of the sun relative to the mobile terminal 100 by placing a light-receiving target icon 1820 to oppose a sun icon 1810.

For instance, FIG. 20A shows that the light-receiving target icon 1802 is displayed to oppose a left top side if the sun is located at a left top side of the mobile terminal 100. And, FIG. 20B shows that the light-receiving target icon 1802 is displayed to oppose a right top side if the sun is located at a right top side of the mobile terminal 100.

Figure 21A:
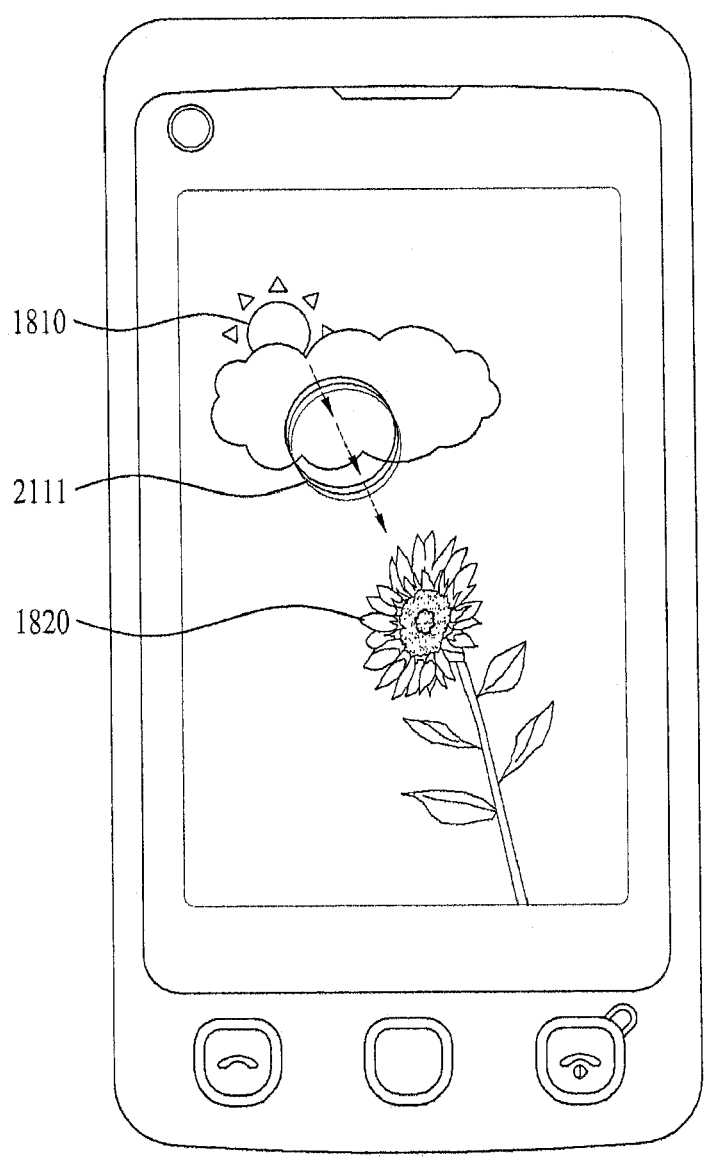
Figure 21B:
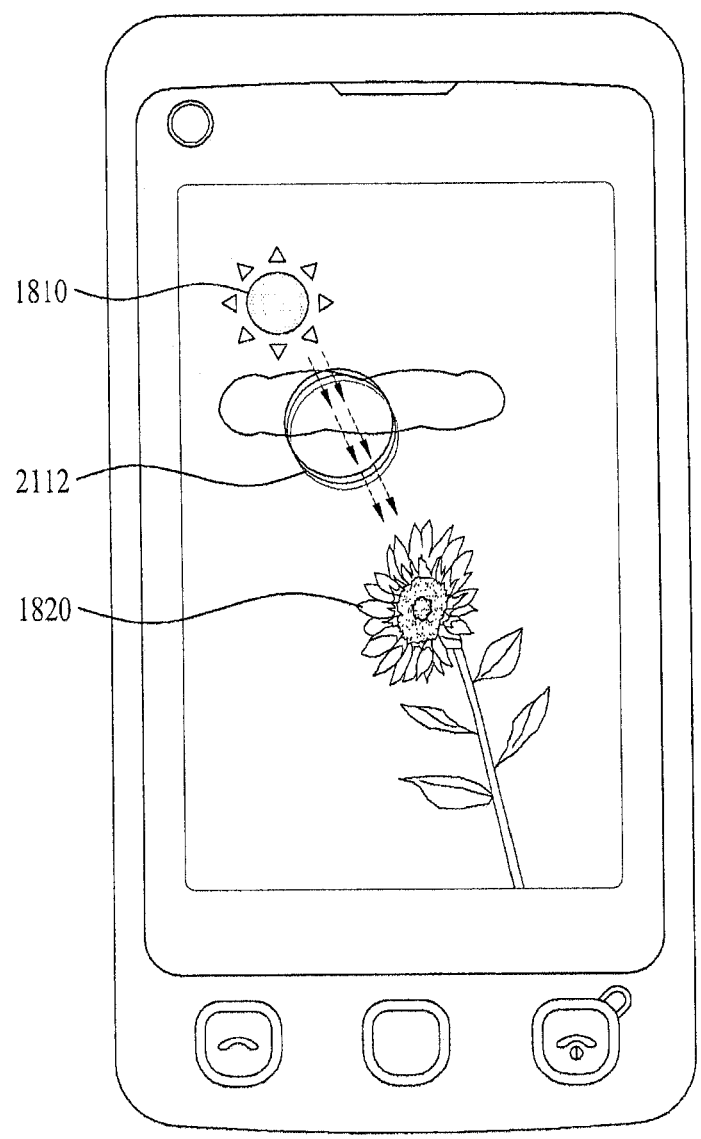
Figure 21C:
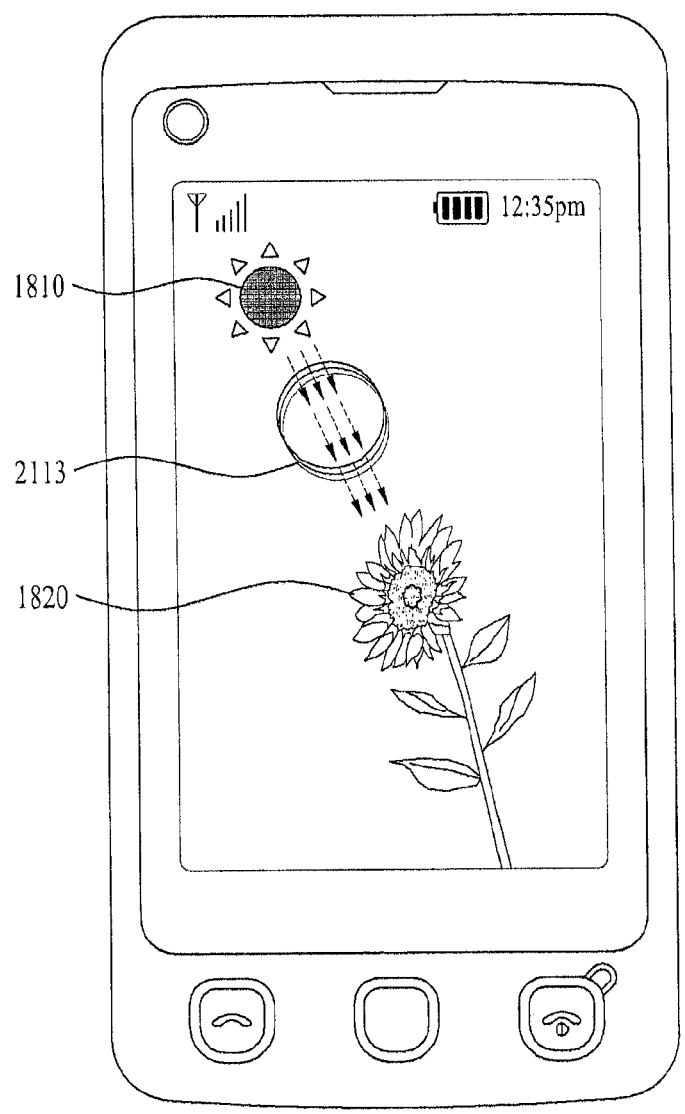

Referring to FIGS. 21A to 21C, the mobile terminal 100 is able to indicate a sunlight strength using sunlight strength icons 2111 to 2113.

For instance, as a sunlight strength gets stronger, the sunlight strength icon 2111, 2112 or 2113 is sequentially displayed in a manner that the number of arrows of the sunlight strength icon 2111, 2112 or 2113 is incremented toward the light-receiving target icon 1820.

Figure 22A:
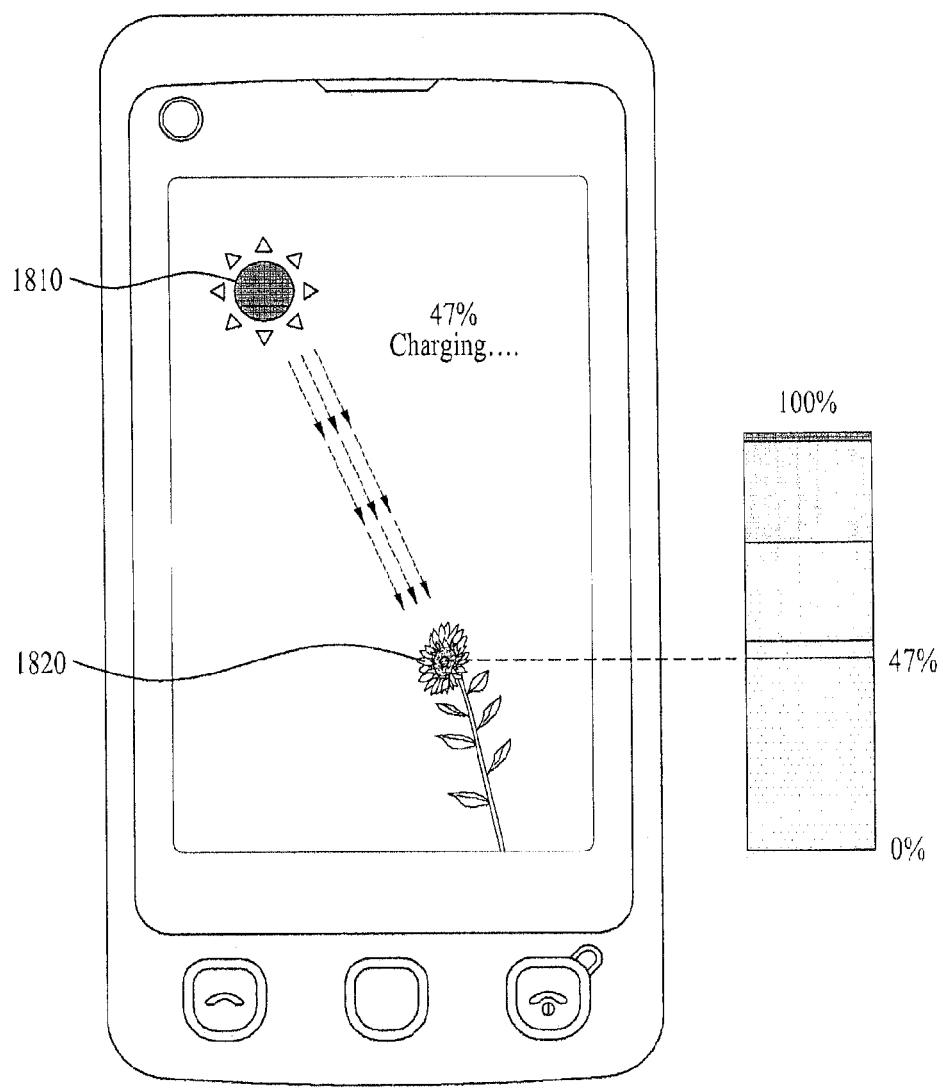
Figure 22B:
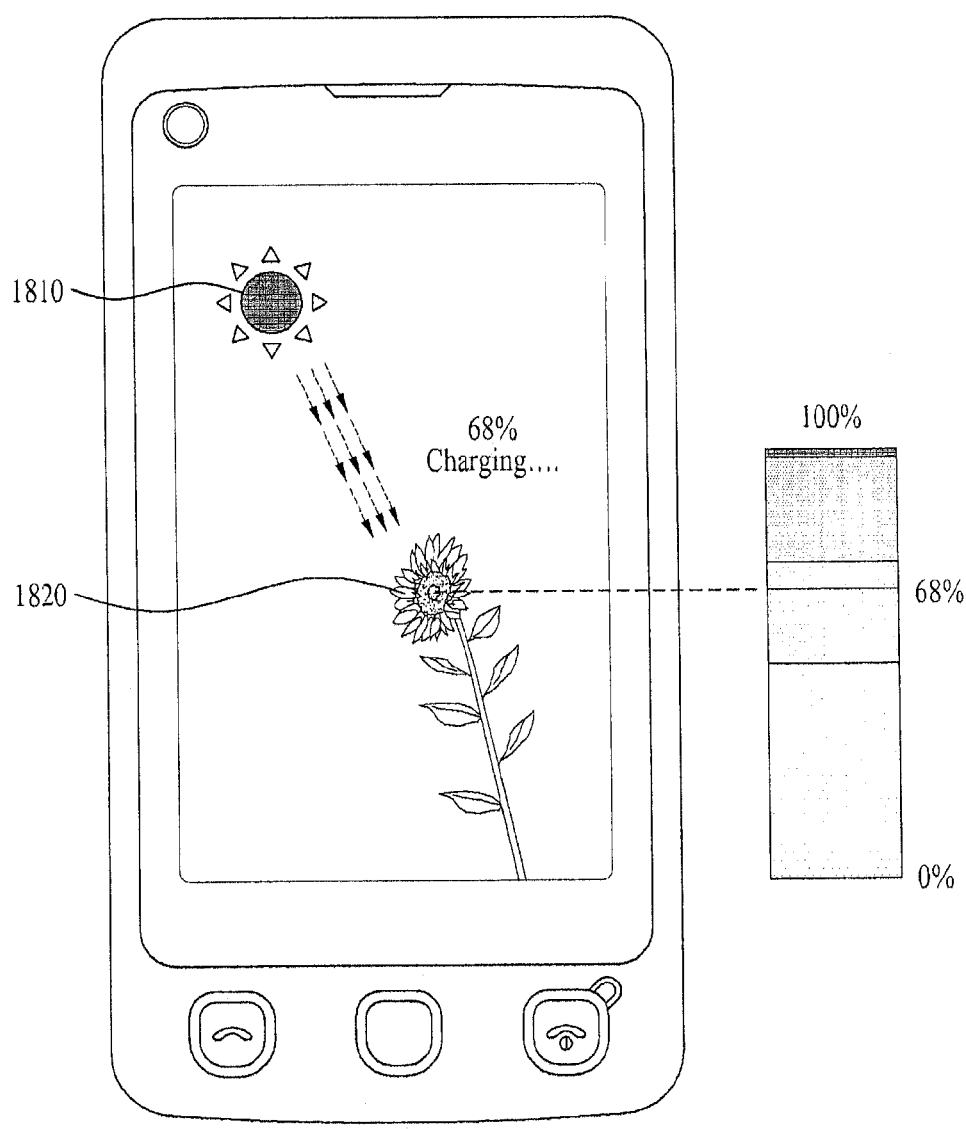
Figure 22C:
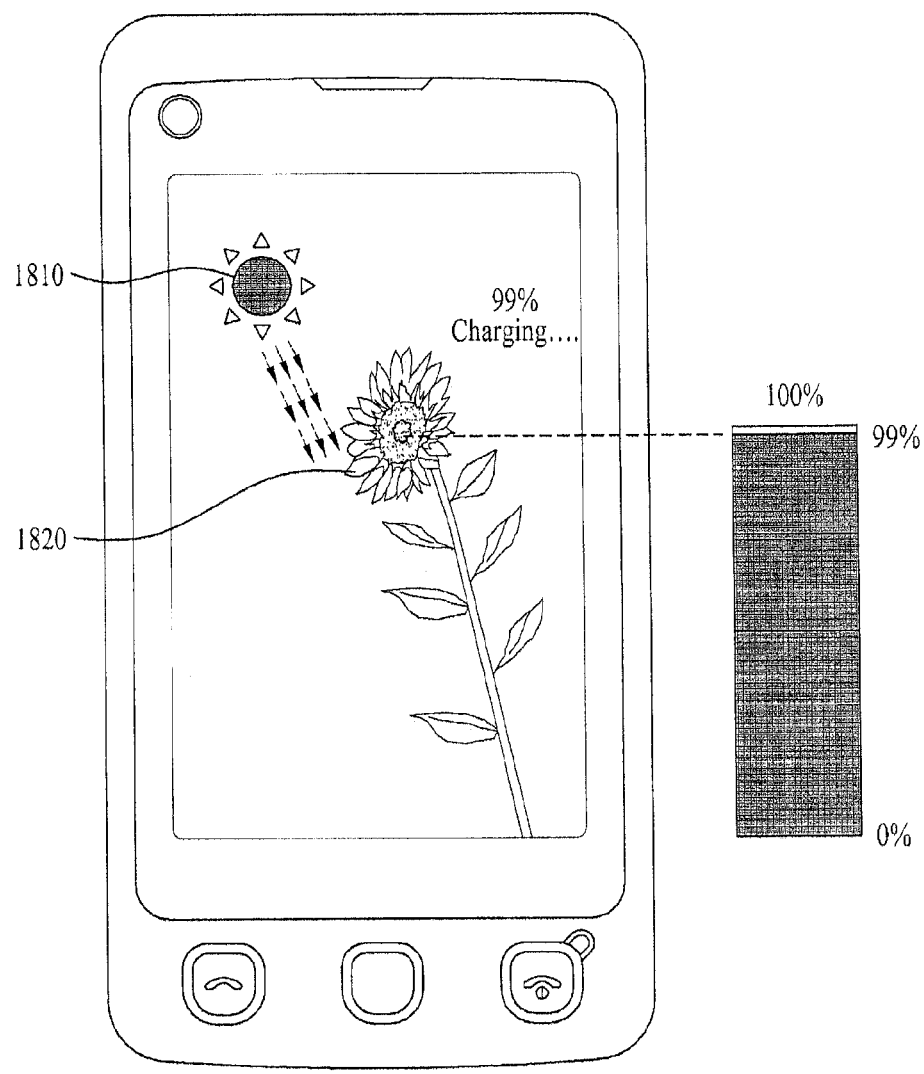

Referring to FIGS. 22A to 22C, the mobile terminal 100 is able to adjust a size of a light-receiving target icon according to a charged level extent of a solar battery. For instance, the mobile terminal 100 enables a size of the light-receiving target icon to increase in proportion to the charged level extent.

Figure 23A:
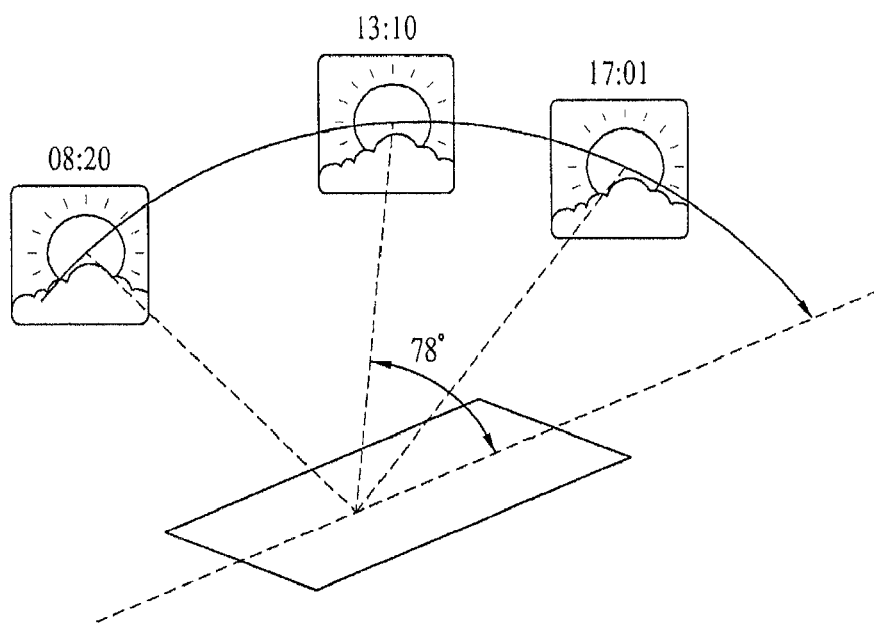
Figure 23B:
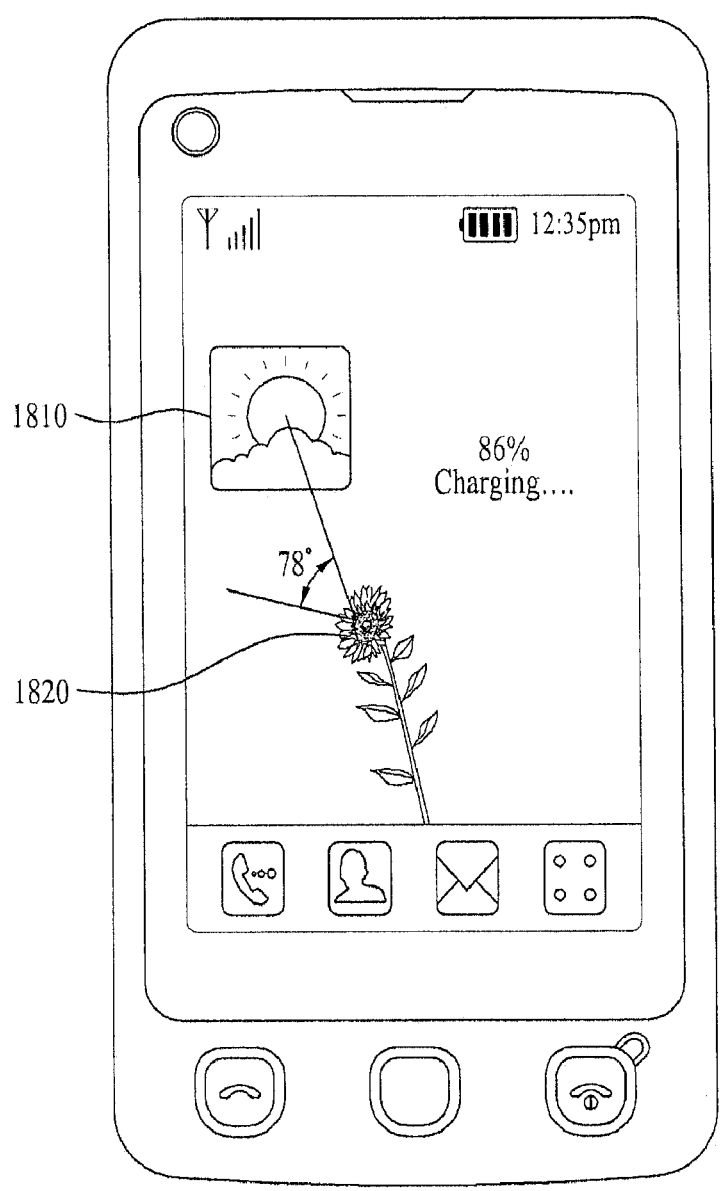

Referring to FIG. 23A and FIG. 23B, the mobile terminal 100 calculates an incident angle of the sun on the mobile terminal and is then able to display an optimal incident angle, which is based on the calculated incident angle, on a screen using a sun icon 1810 and a light-receiving target icon 1820.

The mobile terminal 100 is able to calculate the optimal incident angle using location information of the mobile terminal 100, a date (the 24 solar terms included), ah hour, a direction, gravity information of a gravity sensor and the like. In particular, the mobile terminal 100 is able to obtain an incline extent between the terminal and the ground (a level surface) using its absolute location information (latitude/longitude), trace information of the sun at present hour and date and the gravity sensor. If the mobile terminal 100 is not on a horizontal level, an incline angle of the terminal is calculated using the gravity sensor. And, a compensation value for an optimal incident angle can be set to the calculated incline angle.

For instance, FIG. 23A shows trace information of the sun according to hour and date. And, FIG. 23B shows that an optimal incident angle between the sun and the mobile terminal is 78 degrees.

Figure 24A:
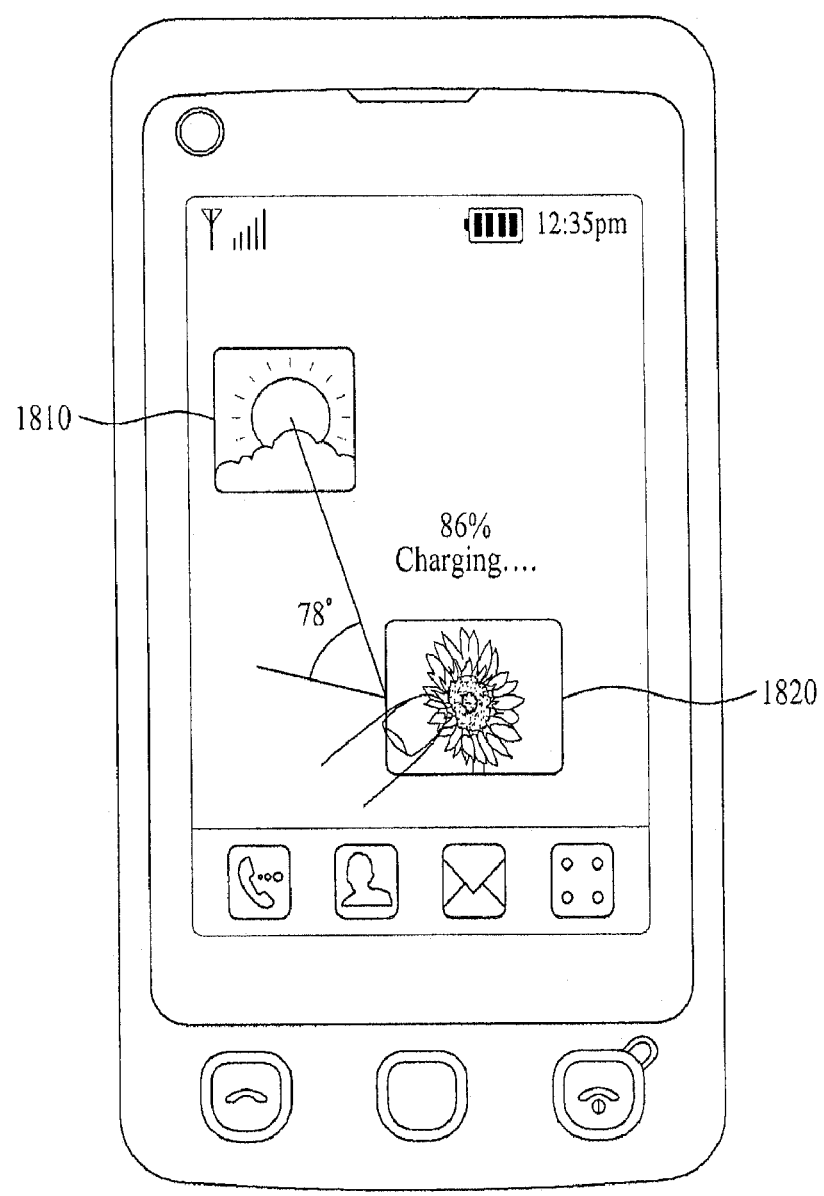
Figure 24B:
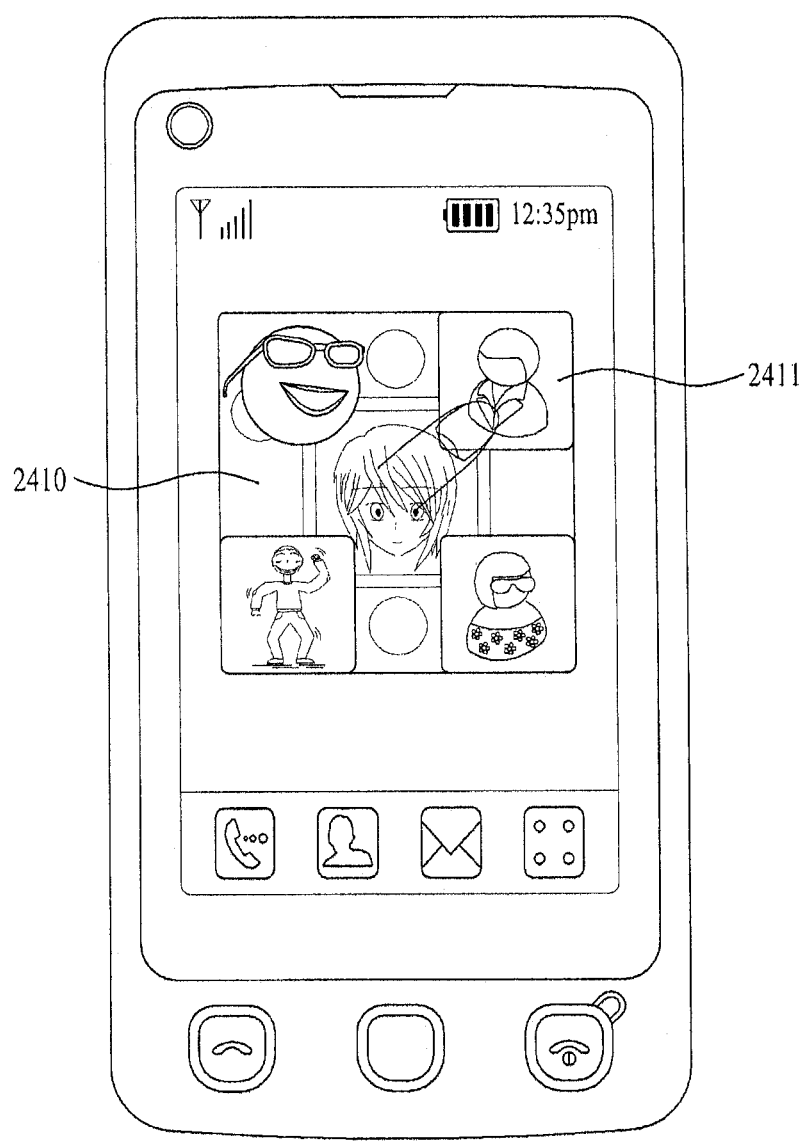
Figure 24C:
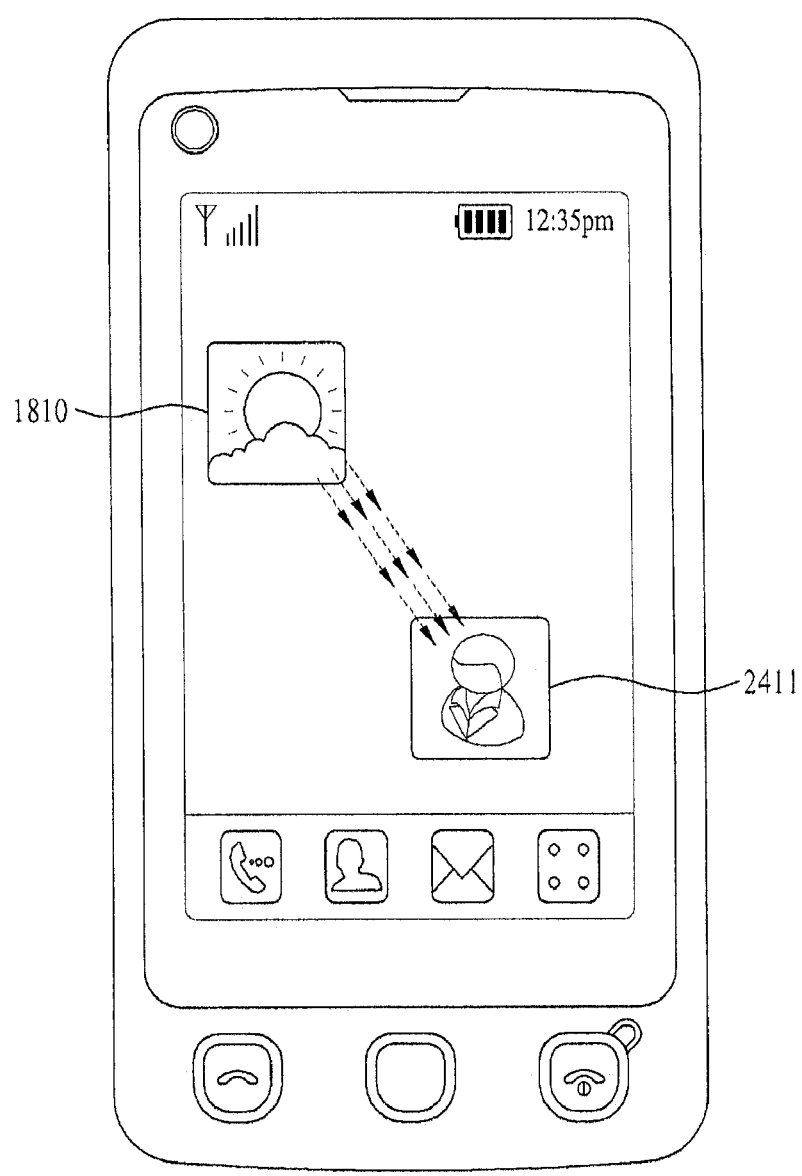

Referring to FIGS. 24A to 24C, the mobile terminal 100 is able to change a light-receiving target icon according to a selection made by a user.

In this case, the light-receiving target icon includes such a character as an avatar and is able to further include an image taken by a camera or an image received from an external terminal.

For instance, in case that a light-receiving target icon 1820 is selected [FIG. 24A], the mobile terminal 100 displays a light-receiving target icon list on a screen [FIG. 24B] and is then able to set a light-receiving target icon selected from the displayed light-receiving target icon list to a new light-receiving target icon [FIG. 24C].

Under the control of the controller 180, the mobile terminal 100 according to the present invention designates power supply target applications to a first power source and a second power source, respectively. In case that the designated power supply target application is driven, the mobile terminal 100 is able to control the power supply unit 190 to supply a power necessary for driving the designated power supply target application from the corresponding power source.

For instance, the power supply target applications can include a communication application (audio/video call, message writing/sending/reception, etc.), a phonebook application (phonebook search, phone number registration, etc.), an audio application (MP3 playback, MP3 download, MP3 recording, etc.), a broadcast application (TV viewing, radio listening, broadcast recording, etc.), a camera application (photo/video photographing, etc.) and the like.

For instance, if the communication application and the audio application are designated to the first power source and the phonebook application and the camera application are designated to the second power source, the controller 180 is supplied with the power necessary for operations of audio/video call, message writing, MP3 playback and the like from the first power source and can be supplied with the power necessary for phonebook search from the second power source.

Moreover, if at least one operation is included in one application, a power can be designated per operation.

A power supply target application per power source (or a power source per power supply target application) is designated according to a specification signal inputted by a user or can be determined by a random determination made by the controller 180.

In particular, in the determination made by the controller 180, it is able to designate a power supply target application per power source with reference to a power level of a first power source, a power level of a second power source, a power (hereinafter named a driving power) necessary for driving an application.

For instance, if a power level of a first power source is higher than that of a second power source, the controller 180 controls an application having a greater driving power to be designated as a power supply target application of the first power source. If a power level of a second power source is lower than a predetermined level, the controller 180 controls an application having a driving power smaller than a predetermined reference to be designated as a power supply target application of the second power source.

Figure 25A:
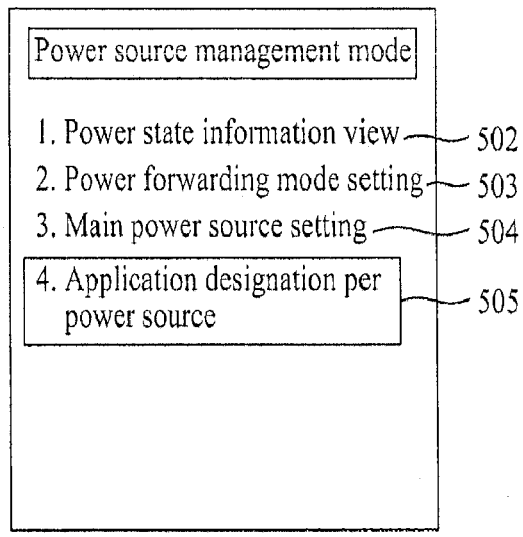
FIG. 25A and FIG. 25B are diagrams of screen configurations for designating an application per power source according to the present invention.
Figure 25B:
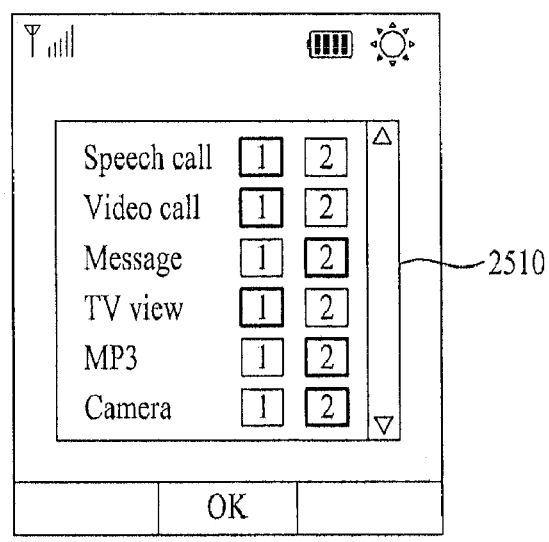

The specification of a power supply target application per power source according to a specification signal from a user is explained in detail with reference to the accompanying drawings as follows. FIG. 25A and FIG. 25B are diagrams of screen configurations for designating an application per power source according to the present invention.

First of all, if a menu item 505 for a per-power source application designation is selected [FIG. 25A], the mobile terminal 100 is able to display a window 2510 for selecting a power supply target application per power source [FIG. 25B].

Therefore, a user is able to designate a first or second power source as a power source for supplying a power to each power supply target application.

For instance, '1' indicated for a power supply target application represents a first power source and '2' indicated for a power supply target application represents a second power source. If a box of '1' is thickly displayed, it means that the first power source is designated to the corresponding power supply target application.

Meanwhile, if a first or second power source includes a solar battery and a charged level by the solar battery is 100%, the mobile terminal 100 indicates that the charged level by the solar battery is 100% (via text, image, vibration, etc.), performs an electronic picture frame function using a power additionally used from an electric charging after a full charging instead of displaying a standby mode image (e.g., a background image), or plays back a previously designated audio/video file [not shown in the drawing]. Of course, if the charged level by the solar battery becomes lower than 100%, the mobile terminal 100 is able to stop the electronic picture frame function or the audio/video file play operation.

According to one embodiment of the present invention, the above-described power source controlling method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, since the present invention facilitates a user to input a power forwarding command action using a power source icon, thereby performing a power forwarding operation efficiently to correspond to the power forwarding command action.

Secondly, the present invention performs a power forwarding operation according to an inter-power source power level comparison result. Even if a power forwarding command action is not inputted by a user, the present invention is able to efficiently perform the power forwarding operation.

Thirdly, the present invention displays power source state information according to a power forwarding, thereby providing a user with the power source state information according to the power forwarding in various ways.

Fourthly, if a solar battery is included in one of a plurality of power sources, the present invention is able to provide a user with various kinds of information according to a charged state of the solar battery.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to a mobile terminal and power source controlling method thereof that substantially obviate one or more problems due to limitations and disadvantages of the related art.

An object of the present invention is to provide a mobile terminal and power source controlling method thereof, by which inter-power source power forwarding operations among a plurality of power sources can be efficiently performed to correspond to a power forwarding command operation inputted by a user.

Another object of the present invention is to provide a mobile terminal and power controlling method thereof, by which inter-power source power forwarding operations among a plurality of power sources can be efficiently performed according to power level comparison results among a plurality of the power sources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a power supply unit including a first power source and a second power source, an output unit displaying first power source state information of the first power source and second power source state information of the second power source, a user input unit receiving an input of a power forwarding command action for forwarding a power from one of the first and second power sources to the other, and a control unit controlling the power supply unit to forward the power from one of the first and second power sources to the other to correspond to the inputted power forwarding command action, the control unit controlling the output unit to display the first and second power source state informations according to the power forwarding.

In another aspect of the present invention, a mobile terminal includes a power supply unit including a first power source and a second power source, a control unit determining power levels of the first and second power sources, respectively, the control unit controlling the power supply unit to forward a power from one of the first and second power sources to the other according to a result of the determination, and an output unit displaying power state information according to the power forwarding under control of the control unit.

In a further aspect of the present invention, a method of controlling a power source in a mobile terminal, which includes a first power source and a second power source, includes a setting step of if an inter-power source power forwarding mode is entered, setting a power forwarding possible state for each of the first and second power sources, a first displaying step of if the power forwarding possible state is set, displaying first power source state information of the first power source and second power source state information of the second power source, an inputting step of externally receiving a power forwarding command action for forwarding a power from one of the first and second power sources to the other, a forwarding step of forwarding the power from one of the first and second power sources to the other to correspond to the inputted power forwarding command action, and a second displaying step of displaying the first and second power source state informations according to the power forwarding.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a power supply unit that includes a first power source and a second power source;
   an output unit to display first power source state information of the first power source and to display second power source state information of the second power source;
   a user input unit to receive an input of a power forwarding command for forwarding power from the first power source to the second power source or for forwarding power from the second power source to the first power source; and
   a controller to control the power supply unit to forward the power from the first power source to the second power source or to forward the power from the second power source to the first power source based on the inputted power forwarding command, and the controller to control the output unit to display the first power source state info nation and the second power source state information according to the power forwarding,
   wherein the output unit displays a first power source icon indicating the first power source state information and displays a second power source icon indicating the second power source state information, and
   the user input unit receives the input of the power forwarding command by a touch & drag from a first point of the first power source icon to a second point of the second power source icon, and
   the controller controls the power supply unit to forward a power level corresponding to a difference between the first point and a current power level of the first power source, from the first power source to the second power source.

2. The mobile terminal of claim 1, wherein the power state information includes at least one of a power level extent, power source type information, power source standby time information, or charged state information, and
   the power source state information according to the power forwarding includes at least one of power forwarding speed information, power forwarding direction information, power forwarding situation information, or power source standby time change information according to the power forwarding.

3. The mobile terminal of claim 1, wherein the controller sets either the first power source or the second power source as a main power source based on at least one of an input of a main power source selection signal from an external environment, a per-power source power level comparison, or a per-power source charged state comparison.

4. The mobile terminal of claim 3, wherein the second power source is set as the main power source when the second power source includes a solar battery and a sunlight intensity or a sunlight strength is equal to or greater than a predetermined reference value.

5. The mobile terminal of claim 1, wherein
   the user input unit further receives the input of the power forwarding command by at least one of a touch to the first point of the first power source icon, or a touch & drag from a random point of the first power source icon to the first point.

6. The mobile terminal of claim 1, wherein the controller determines power levels of the first power source and the second power source, and the controller controls the power supply unit to forward the power from the first power source to the second power source when as a result of the determination at least one of the power level of the first power source is higher than the power level of the second power source, the power level of the first power source is equal to or greater than a first reference value, the first power source is fully charged, or the power level of the second power source is lower than a second reference value.

7. The mobile terminal of claim 1, wherein either the first power source or the second power source includes a solar battery.

8. The mobile terminal of claim 7, wherein the output unit displays a power source icon indicating a charged level of the solar battery and a sunlight strength.

9. The mobile terminal of claim 7, wherein the output unit displays light-receiving state indication info nation using a sun icon and a light-receiving target icon, and the light-receiving state indication information represents at least one of a sunlight intensity, a sunlight strength, a charged level extent, an altitude and incident angle of the sun for a mobile terminal, time remaining for sunset or an optimal incident angle of the sun for a mobile terminal.

10. The mobile terminal of claim 1, wherein the controller designates a power supply target application to each of the first power source and the second power source, and the controller controls the power supply unit to supply the power from the corresponding power source when the designated power supply target application is driven.

11. The mobile terminal of claim 1, wherein the first power source includes a first battery and the second power source includes a second battery, and wherein the power supply unit charges the first battery by using the power forwarded from the second power source to the first battery, or charges the second battery using the power forwarded from the first power source to the second battery based on the inputted power forwarding command.

12. A mobile terminal comprising:
a power supply unit that includes a first power source and a second power source;
a controller to determine a power level of each of the first power source and the second power source, and based on a result of the determination the controller controls the power supply unit to forward power from the first power source to the second power source, or controls the power supply unit to forward power from the second power source to the first power source;
an output unit to display first power source state information of the first power source and to display second power source state information of the second power source according to the power forwarding; and
a user input unit to receive an input of a power forwarding command for forwarding power from a first one of the first power source and the second power source to a second one of the first power source and the second power source,
wherein the output unit displays a first power source icon indicating the first power source state information and displays a second power source icon indicating the second power source state information, and wherein when the user input unit receives the input of the power forwarding command by a touch & drag from a first point of the first power source icon to a second point of the second power source icon, the controller controls the power supply unit to forward a power level corresponding to a difference between the first point and a current power level of the first power source, from the first power source to the second power source.

13. The mobile terminal of claim 12, wherein the power source state information according to the power forwarding includes at least one of power forwarding speed information, power forwarding direction information, power forwarding situation information, or power source standby time change information.

14. The mobile terminal of claim 12, wherein the controller sets either the first power source or the second power source as a main power source based on at least one of an input of a main power source selection signal from an external environment, a per-power source power level comparison, or a per-power source charged state comparison.

15. The mobile terminal of claim 12, wherein based on the result of the determination, the controller controls the power supply unit to forward the power from the first power source to the second power source when the power level of the first power source is higher than the power level of the second power source, when the power level of the first power source is equal to or greater than a first reference value, when the first power source is fully charged, or when the power level of the second power source is lower than a second reference value.

16. The mobile terminal of claim 15, wherein the controller performs the power forwarding to enable a power level of the first power source to maintain a power level limit.

17. The mobile terminal of claim 12,
wherein the first power source includes a first battery and the second power source includes a second battery, and
wherein the controller controls the power supply unit to charge the first battery by using the power forwarded from the second power source to the first battery, or to charge the second battery using the power forwarded from the first power source to the second battery based on the inputted power forwarding command.

18. The mobile terminal of claim 12, wherein either the first power source or the second power source includes a solar battery.

19. A method of controlling a power source in a mobile terminal that includes a first power source and a second power source, the method comprising:
setting a power forwarding possible state;
displaying first power source state information of the first power source and second power source state information of the second power source when the power forwarding possible state is set;
receiving a power forwarding command for forwarding power from the first power source to the second power source, or for forwarding power from the second power source to the first power source;
forwarding the power from the first power source to the second power source, or forwarding the power from the second power source to the first power source based on the power forwarding command; and
displaying the first power source state information and the second power source state information based on the power forwarding,
wherein displaying the first power source state information includes displaying a first power source icon indicating the first power source state information and displaying a second power source icon indicating the second power source state information, wherein receiving the power forwarding command includes receiving an input of the power forwarding command by a touch & drag from a first point of the first power source icon to a second point of the second power source icon, and wherein forwarding the power includes forwarding a power level corresponding to a difference between the first point and a current power level of the first power source, from the first power source to the second power source.

20. The method of claim 19, further comprising:

setting either the first power source or the second power source as a main power source based on at least one of an input of a main power source selection signal from an external environment, a per-power source power level comparison, or a per-power source charged state comparison.

21. The method of claim 19, further comprising:

determining a power level of each of the first power source and the second power source, wherein the power is forwarded from the first power source to the second power source when the power level of the first power source is higher than the power level of the second power source, when the power level of the first power source is equal to or greater than a first reference value, when the first power source is fully charged, or when the power level of the second power source is lower than a second reference value.

22. The method of claim 19, wherein receiving the power forwarding command further includes receiving an input of the power forwarding command by at least one of a touch to the first point of the first power source icon or a touch & drag from a random point of the first power source icon to the first point.

23. The method of claim 19, wherein the first power source includes a first battery and the second power source includes a second battery, and wherein forwarding the power comprises charging the first battery by using the power forwarded from the second power source to the first battery, or charging the second battery using the power forwarded from the first power source to the second battery based on the power forwarding command.

* * * * *